US012628859B2

(12) United States Patent
Samuel et al.

(10) Patent No.: US 12,628,859 B2
(45) Date of Patent: May 19, 2026

(54) HUMAN MILK FORTIFIER

(71) Applicant: SOCIETE DES PRODUITS NESTLE S.A., Vevey (CH)

(72) Inventors: Tinu Mary Samuel, Epalinges (CH); Aristea Binia, Fribourg (CH); Norbert Sprenger, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/628,736

(22) PCT Filed: Jul. 5, 2018

(86) PCT No.: PCT/EP2018/068268
§ 371 (c)(1),
(2) Date: Jan. 6, 2020

(87) PCT Pub. No.: WO2019/008105
PCT Pub. Date: Jan. 10, 2019

(65) Prior Publication Data
US 2020/0281245 A1 Sep. 10, 2020

(30) Foreign Application Priority Data

Jul. 7, 2017 (EP) .................................... 17180275

(51) Int. Cl.
| | |
|---|---|
| *A23L 33/00* | (2016.01) |
| *A23L 33/12* | (2016.01) |
| *A23L 33/125* | (2016.01) |
| *A23L 33/135* | (2016.01) |
| *A23L 33/15* | (2016.01) |

(Continued)

(52) U.S. Cl.
CPC .............. *A23L 33/40* (2016.08); *A23L 33/12* (2016.08); *A23L 33/125* (2016.08); *A23L*

*33/135* (2016.08); *A23L 33/15* (2016.08); *A23L 33/16* (2016.08); *A23L 33/17* (2016.08)

(58) Field of Classification Search
CPC .. A61K 2300/00; A61K 31/702; A61K 35/20; A61K 38/018; A23V 2002/00; A23V 2200/3202; A23V 2250/28; A23V 2200/322; A23V 2200/324;

(Continued)

(56) References Cited

U.S. PATENT DOCUMENTS

| | | | | |
|---|---|---|---|---|
| 2008/0118615 | A1* | 5/2008 | Hartmann ................. | A61P 3/02 702/19 |
| 2012/0172319 | A1* | 7/2012 | Chow ..................... | A23L 33/12 514/54 |
| 2012/0172330 | A1* | 7/2012 | Buck .................... | A61K 9/0053 514/61 |

FOREIGN PATENT DOCUMENTS

| | | |
|---|---|---|
| EP | 3095331 | 11/2016 |
| EP | 3111942 | 1/2017 |

(Continued)

OTHER PUBLICATIONS

Bode, Lars, Human Milk Oligosaccharides; Every Baby Needs a Sugar Mama, Apr. 18, 2012, Glycobiology, vol. 22, No. 9, pp. 1147-1162. (Year: 2012).*

(Continued)

*Primary Examiner* — Hong T Yoo
(74) *Attorney, Agent, or Firm* — K&L Gates LLP

(57) ABSTRACT

A human milk fortifier composition comprising one or more human milk oligosaccharides. Said human milk fortifier composition may be tailored to fortify the breast milk of a primiparous woman.

20 Claims, 10 Drawing Sheets boxplot of 2' – Fucosyllactose in mg/L

Age of infant

(51) Int. Cl.
    *A23L 33/16*           (2016.01)
    *A23L 33/17*           (2016.01)

(58) Field of Classification Search
    CPC .............. A23V 2250/282; A23C 9/206; A23C
                                  2240/05; A23L 33/40
    USPC .......................................... 426/231, 801, 72
    See application file for complete search history.

(56)                       References Cited

FOREIGN PATENT DOCUMENTS

| | | | |
|---|---|---|---|
| WO | 9843494 | A1 | 10/1998 |
| WO | 2015071402 | | 5/2015 |
| WO | 2015071403 | | 5/2015 |
| WO | 2015078507 | | 6/2015 |
| WO | 2017129646 | | 8/2017 |
| WO | 2017129648 | | 8/2017 |

OTHER PUBLICATIONS

European Office Action for Application No. 18 734 598.8-1105 dated May 22, 2023.

\* cited by examiner boxplot of 2' – Fucosyllactose in mg/L boxplot of 3' – Fucosyllactose in mg/L boxplot of 6' – Galactosyllactose in mg/L boxplot of BloodgroupA–Tetrasaccharide in mg/L boxplot of Difucosyllacto-N-Hexaose-a in mg/L boxplot of Lacto-N-Difucosylhexaose in mg/L boxplot of Lacto−N−Fucosylpentaose−I in mg/L boxplot of Lacto−N−Fucosylpentaose−II in mg/L boxplot of Lacto-N-hexaose (A) in mg/L boxplot of Lacto-N-hexaose (B) in mg/L boxplot of Lacto-N-Neotetraose in mg/L boxplot of Lacto-N-Tetraose in mg/L boxplot of Lactodifucosyllactose in mg/L boxplot of Sialyllacto-N-Tetraose a in mg/L

HUMAN MILK FORTIFIER

CROSS REFERENCE TO RELATED APPLICATIONS

The present application is a National Stage of International Application No. PCT/EP2018/068268, filed on Jul. 5, 2018, which claims priority to European Patent Application No. 17180275.4, filed on Jul. 7, 2017, the entire contents of which are being incorporated herein by reference.

TECHNICAL FIELD OF THE INVENTION

The present invention relates to a human milk fortifier composition, more specifically to a human milk fortifier composition comprising human milk oligosaccharides. In particular the present invention relates to a human milk fortifier composition specifically tailored to fortify the breastmilk of a primiparous woman, and for consumption by an infant or child born who is the offspring of a primiparous mother. The invention furthermore relates to the use of said human milk fortifier composition.

BACKGROUND OF THE INVENTION

Infants who are the offspring of primiparous woman are considered to be at an increased risk of suffering from a variety of health complaints in infancy, childhood, and later life. Infants born of primiparous mothers are more likely to be smaller and/or thinner at birth, and so at an increased risk of suffering from conditions associated with being small and/or underweight, and at the same time are also more likely to be larger children and suffer from conditions associated with being larger e.g. being overweight or obese—this is because of dramatic catch-up gains in weight and length that overcompensate for their initial size deficit.

The reasons for the increased health risks seen in infants who are the offspring of primiparous mothers is not clear. However, there is a need to identify factors that may contribute to this risk and to address them.

The inventors have now identified a factor that they believe may contribute to this risk. In particular the inventors have found that the concentration of one or more human milk oligosaccharides (herein after "HMOs") found in human breast milk (hereinafter "HM") produced by primiparous mothers, may differ from the concentration found in HM produced by multiparous mothers. More particularly the inventors have found that the concentration of an HMO found in HM produced by primiparous mothers may be lower than the concentration of the same HMO found in HM produced by multiparous mothers.

HMOs are, collectively, the third largest solid constituents in human milk, and a variety of benefits have been associated with them, in consequence, an optimal intake of these compounds in infancy and childhood is believed to be necessary to ensure optimum health and development. HMOs have for example been linked to a variety of biological functions including the establishment of gut microbiota. Some HMOs have also been linked to growth and body composition.

Accordingly, there is need for milk fortifiers comprising one or more HMO that can be used to fortify HM produced by primiparous mothers, and to optimise the intake of one or more HMO in infants consuming HM from a primiparous mother.

SUMMARY OF THE INVENTION

The invention is set out in the claims and in the detailed description included herein. The inventors have found that the concentration of an HMO found in HM produced by multiparous mothers may be higher than the concentration of the same HMO found in HM produced by primiparous mothers. In light of this finding, the inventors have developed a human milk fortifier composition comprising one or more HMOs.

Said human milk fortifier may be tailored to fortify the breast milk of a primiparous women.

The one or more HMO may be a sialylated oligosaccharide, a fucosylated oligosaccharide, an N-acetylated oligosaccharide, or any combination thereof. The one or more HMO may for example be selected from the group consisting of; 2'-Fucosyllactose, 3'-Fucosyllactose, 6'Galactosyllactose, Blood group A Tetrasaccharide, Difucosyllacto-N-Hexose-A, Lacto-N-Difucosylhexose, Lacto-N-Fucosylpentaose-I, Lacto-N-Fucosylpentaose-II, Lacto-N-Fucosylpentaose-III, Lacto-N-Fucosylpentaose-V, Lacto-N-hexaose A, Lacto-N-hexaose B, Lacto-N-Neodifucosylhexose, Lacto-N-Neofucosylpentaose, Lacto-N-Neotetraose, Lacto-N-Tetraose, Lactodifucosyllactose, Sialyllacto-N-Tetraose a, Sialyllacto-N-Tetraose b, and any combination thereof.

It may be particularly beneficial if the HMO is selected from the group consisting of; 3'-Fucosyllactose, Lacto-N-Fucosylpentaose, and any combination thereof.

The human milk fortifier composition may comprise an HMO in a range of 0.1 to 10000 mg/L.

The human milk fortifier may be specifically tailored for up an infant of an age selected from the group consisting of; up to 4 months of age, up to 3 months of age, up to 2 months of age, up to 1 months of age, up to 2 weeks of age, and up to 1 week of age. It may for example be specifically tailored to supplement breastmilk produced for up an infant of up to one month of age or up to 2 weeks of age. The infant may be an infant of a primiaparous woman.

The human milk fortifier may further comprise one or more ingredient selected from the group consisting of vitamins, minerals, protein, carbohydrates, and probiotics.

Further provided is a method of preparing a human milk fortifier composition tailored to fortify the breast milk of a primiparous women, said method comprising the steps of: measuring out an appropriate amount of a human milk fortifier composition and mixing it with a diluent and/or additive.

Also provided is a human milk fortifier as defined herein, for use in fortifying human breast milk and in particular human breastmilk from a primiparous woman.

The human milk fortifier as defined herein may to provide an optimised amount of one or more HMO to an infant. The infant may be selected from the group consisting of: preterm infants and term infants. The infant may be an infant who is the offspring of a primiparous mother.

Also provided is a nutritional system comprising:
a. a human milk fortifier composition tailored to fortify the breast milk of a primiparous women, and
b. A human milk fortifier composition, wherein, said human milk fortifier composition tailored to fortify the breast milk of a primiparous women comprises one or more HMO in a concentration higher than in the human milk fortifier composition. The method may also comprise the step of determining whether the woman is a primiaparous woman.

DRAWINGS

DETAILED DESCRIPTION

Figure 1:
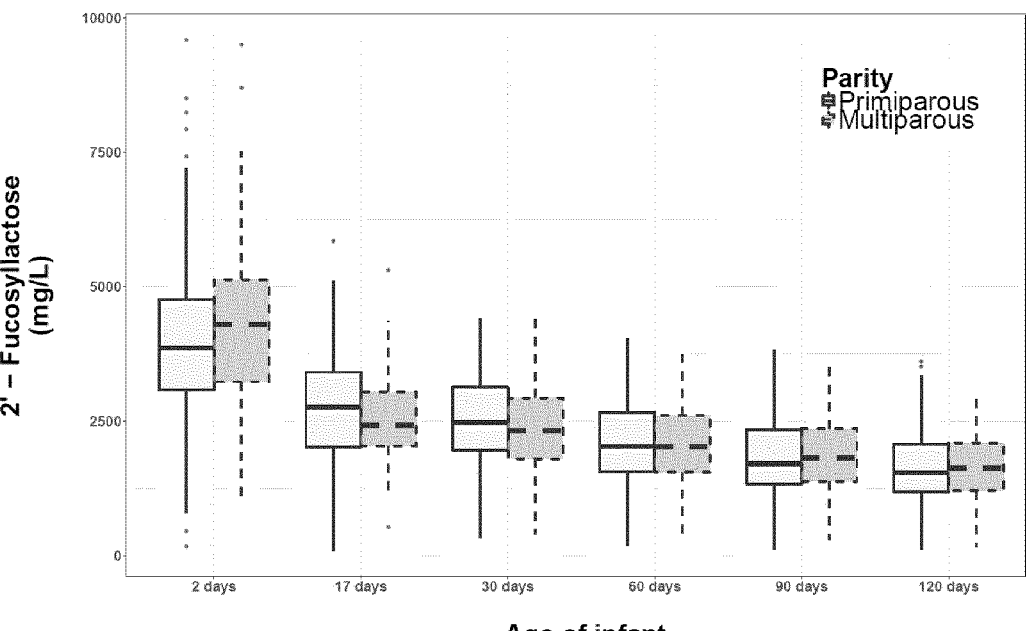
FIG. 1 is a graphical representation of the 2'-fucosyllactose concentration found in HM by delivery mode at 2 days (V1), 17 days (V2), 30 days (V3) 60 days (V4), 90 days (V5), and 120 days (V6) postpartum.

In a first aspect of the present invention there is provided a human milk fortifier composition comprising one or more HMO.

The term "human milk fortifier composition" as used herein, refers to a nutritional composition for use in combination and in admixture with human breast milk. Unless otherwise specified, the term "human milk fortifier composition" specifically excludes conventional infant formulas that provide the sole or primary source of infant nutrition and that are not typically combined and admixed with human milk to supplement human milk feedings.

The term "fortifier" refers to a composition which comprises one or more nutrients having a nutritional benefit for infants, both preterm infants and term infants. The fortifier according to the present invention is rich in HMOs and may therefore be considered as an HMO fortifier, HMO supplement or the like.

In an embodiment of the invention, the human milk fortifier composition is tailored/adapted to fortify the breast milk of a primiparous women. A human milk fortifier, as disclosed herein, may be considered as specifically tailored/adapted to fortify the breast milk of a woman who is primaprous if it comprises one or more HMO as described herein. Said human milk fortifier may, for example, comprise said one or more HMO in an amount sufficient to address the deficiency of one or more HMO identified in the human breast milk of primiaparous mothers in comparison to multiparous mothers. A sufficient amount of an HMO may for example be an amount equal to or greater than an amount that an infant born to a multiparous woman would receive, or may for example, be any amount that is equal to or higher than the difference found in the concentration e.g. averages, in human milk produced by primparous women and multiparous women. Said human milk fortifier composition may be a parity specific human milk fortifier i.e. a milk fortifier sold specifically for use in primiparous women e.g. marketed as a being for use to fortify the breastmilk of primiparous women The term "multiparous" as used herein refers to a woman who has given birth more than once or has more than 1 child.

The term "primiparous" as used herein refers to a woman who has given birth once, or has only 1 child.

The term "infant" as used herein, refers to humans of less than about 1 year of age. The term includes preterm infants, premature infants, small for gestational age (SGA) infants and/or infant with low birth weight (LBW).

The terms "preterm infants" or "premature infants" as used herein, refer to infants who were not born at term. Generally they refers to infants born alive prior to 37 weeks of gestation/pregnancy.

The term "small for gestational age infant" as used herein, refers to an infant who is smaller in size than normal for their gestational age at birth, most commonly defined as a weight below the 10th percentile for the gestational age. In some embodiments, SGA may be associated with intrauterine growth restriction (IUGR), which refers to a condition in which a foetus is unable to achieve its potential size.

The term "low birth weight infants" as used herein refers to an infant that has a body weight under 2500 g at birth. It therefore encompasses:

infants who have/had a body weight from 1800 to 2500 g at birth (usually called "low birth weight" or LBW)

infants who have/had a body weight from 1000 to 1800 g at birth (called "very low birth weight" or VLBW)

infants who have/had a body weight under 1000 g at birth (called "extremely low birth weight" or ELBW) Infants or young children with low birth weight may or may not be preterm, and similarly, infants or young children who were small for gestational age may or may not be preterm.

The term "child" as used herein, refers to humans from about 1 to about 7 year of age, for example, between 1 and 3 years of age.

The human milk fortifier composition of the invention may comprise any type of HMO.

In an embodiment of the present invention the human milk fortifier comprise a HMO selected from the group consisting of a sialylated oligosaccharide, a fucosylated oligosaccharide, an N-acetylated oligosaccharide, or any combination of the foregoing.

The term "sialylated oligosaccharide" as used herein refers to an oligosaccharide having a sialic acid (such as N-acetylneuraminic acid and/or N-glycolylneuraminic acid) residue.

The term "N-acetylated" oligosaccharide as used herein refers to an oligosaccharide having at least one hexose carrying an N-acetyl residue.

The term "fucosylated oligosaccharide" as used herein refers to an oligosaccharide having a fucose residue.

In a more specific embodiment the human milk fortifier composition of the invention comprises an HMO selected from the group consisting of: 2'-Fucosyllactose, 3-Fucosyllactose, 6'Galactosyllactose, Blood group A Tetrasaccharide, Difucosyllacto-N-Hexose-A, Lacto-N-Difucosylhexose, Lacto-N-Fucosylpentaose-I, Lacto-N-Fucosylpentaose-II, Lacto-N-Fucosylpentaose-III, Lacto-N-Fucosylpentaose-V, Lacto-N-hexaose A, Lacto-N-hexaose B, Lacto-N-Neodifucosylhexose, Lacto-N—N eofucosylpentaose, Lacto-N-Neotetraose, Lacto-N-Tetraose, Lactodifucosyllactose, Sialyllacto-N-Tetraose a, Sialyllacto-N-Tetraose b, and any combination thereof.

In an even more specific embodiment the human milk fortifier composition of the invention comprises an HMO selected from the group consisting of: 3-Fucosyllactose, Lacto-N-Fucosylpentaose II, 2'-Fucosyllactose and any combination thereof.

The human milk fortifier composition of the invention may comprise an HMO in any concentration.

In particular the human milk fortifier composition may comprise one an HMO in a concentration of 0.1 to 10000 ring/L e.g. 0.1 to 6000 mg/L e.g. 0.1 to 350 mg/L.

The concentrations listed herein may refer to a concentration after a composition has been reconstituted or mixed with water or milk.

The human milk fortifier composition of the invention may for example comprise one or more of the HMOs listed in table I in a concentration range listed in table I.

TABLE I

| HMO | Concentration Range mg/L |
| --- | --- |
| 2'-Fucosyllactose | 9-8500 |
| 3-Fucosyllactose | 1-3600 |
| 6'Galactosyllactose | 0.09-250 |
| Blood group A Tetrasaccharide | 1-1000 |
| Difucosyllacto-N-Hexose-A | 0.4-1100 |
| Lacto-N-Difucosylhexose | 20-3000 |
| Lacto-N-Fucosylpentaose-I | 0.4-4300 |
| Lacto-N-Fucosylpentaose-II | 32-3600 |
| Lacto-N-Fucosylpentaose-III | 13-800 |
| Lacto-N-Fucosylpentaose-V | 1.5-500 |
| Lacto-N-hexaose A | 0.15-200 |
| Lacto-N-hexaose B | 0.3-120 |
| Lacto-N-Neodifucosylhexose | 0.3-330 |
| Lacto-N-Neofucosylpentaose | 0.1-65 |
| Lacto-N-Neotetraose | 0.1-700 |
| Lacto-N-Tetraose | 4-3400 |
| Lactodifucosyllactose | 2-3300 |
| Sialyllacto-N-Tetraose a | 1.5-1900 |
| Sialyllacto-N-Tetraose b | 0.7-180 |

In an embodiment of the present invention the human milk fortifier composition of the invention may comprise one or more of the HMOs listed in table II in the concentration range listed in table II.

TABLE II

| HMO | Concentration Range mg/L |
| --- | --- |
| 2'-Fucosyllactose | 9-350 |
| 3-Fucosyllactose | 51-230 |
| 6'Galactosyllactose | 0.09-11 |
| Blood group A Tetrasaccharide | 1.5-22 |
| Difucosyllacto-N-Hexose-A | 0.4-9 |
| Lacto-N-Difucosylhexose | 20-160 |
| Lacto-N-Fucosylpentaose-I | 0.4-75 |
| Lacto-N-Fucosylpentaose-II | 14-190 |
| Lacto-N-Fucosylpentaose-III | 13-16 |
| Lacto-N-Fucosylpentaose-V | 1.5-22 |
| Lacto-N-hexaose A | 2-4 |
| Lacto-N-hexaose B | 1-4.5 |
| Lacto-N-Neodifucosylhexose | 1.1-9 |
| Lacto-N-Neofucosylpentaose | 1.8-6 |
| Lacto-N-Neotetraose | 0.1-6 |
| Lacto-N-Tetraose | 23-125 |
| Lactodifucosyllactose | 2-38 |
| Sialyllacto-N-Tetraose a | 1.5-36 |
| Sialyllacto-N-Tetraose b | 0.7-11 |

The human milk fortifier of the invention may be tailored to fortify breastmilk produced for an infant or child of any age e.g. any age born to a primparous mother In an embodiment of the present invention the human milk fortifier composition is tailored/adapted to fortify breastmilk produced for an infant of an age selected from the group consisting of; up to 4 months of age, up to 3 months of age, up to 2 months of age, up to 1 months of age, up to 2 weeks of age, up to 1 week of age. For example the human milk fortifier composition may be tailored/adapted to fortify breastmilk produced for an infant up to 1 month of age e.g. up to 2 weeks of age. The infant may be born to a primparous mother.

In an embodiment of the present invention the human milk fortifier is tailored/adapted for an infant of up to 1 month of age e.g. an infant up to 2 weeks of age, or an infant up to 1 week of age and said composition comprises one or more HMO selected from the group consisting of 3-Fucosyllactose, Lacto-N-Fucosylpentaose II, 2'-Fucosyllactose, and any combination thereof. In a more specific embodiment said HMOs, if present in said human milk fortifier tailored/ adapted for an infant of up to 1 month of age, may be present in a concentration range as set out in table III.

TABLE III

| HMO | Concentration Range mg/L |
|---|---|
| 3-Fucosyllactose | 51-230 |
| Lacto-N-Fucosylpentaose II | 14-190 |
| 2'-Fucosyllactose | 9-350 |

The human milk fortifier composition of the invention can also comprise any other ingredients or excipients known to be employed in human milk fortifier compositions.

Non limiting examples of such ingredients include: proteins, amino acids, carbohydrates, lipids, prebiotics or probiotics, essential fatty acids, nucleotides, nucleosides, vitamins, minerals and other micronutrients.

In an embodiment of the invention the human milk fortifier composition further comprises one or more ingredient selected from the group consisting of vitamins, minerals, protein, carbohydrates, and probiotics.

Non limiting examples of proteins include: casein, alpha-lactalbumin, whey, soy protein, rice protein, corn protein, oat protein, barley protein, wheat protein, rye protein, pea protein, egg protein, sunflower seed protein, potato protein, fish protein, meat protein, lactoferrin, serum albumin, immunoglobins, and combinations thereof.

Non limiting examples of amino acids include leucine, threonine, tyrosine, Isoleucine, arginine, alanine, histidine, isoleucine, proline, valine, cysteine, glutamine, glutamic acid, glycine, serine, arginine, lysine, methionine, phenylalanine, tryptophane, asparagine, aspartic acid, and combinations thereof.

Non limiting examples of carbohydrates include lactose, saccharose, maltodexirin, starch, and combinations thereof.

Non limiting examples of lipids include: palm olein, high oleic sunflower oil, high oleic safflower oil, canola oil, fish oil, coconut oil, bovine milk fat, and combinations thereof.

Non limiting examples of essential fatty acids include: linoleic acid (LA), a-linolenic acid (ALA) and polyunsaturated fatty acids (PUFAs). The gender specific synthetic nutritional compositions of the invention may further contain gangliosides monosialoganglioside-3 (GM3) and disialogangliosides 3 (GD3), phospholipids such as sphingomyelin, phospholipids phosphatidylcholine, phosphatidylethanolamine, phosphatidylinositol, phosphatidylserine, and combinations thereof.

None limiting examples of prebiotics include: oligosaccharides (other than HMOs) optionally containing fructose, galactose, mannose; dietary fibers, in particular soluble fibers, soy fibers; inulin; and combinations thereof. Preferred prebiotics are fructo-oligosaccharides (FOS), galacto-oligosaccharides (GOS), isomalto-oligosaccharides (IMO), xylo-oligosaccharides (XOS), arabino-xylo oligosaccharides (AXOS), mannan-oligosaccharides (MOS), oligosaccharides of soy, glycosylsucrose (GS), lactosucrose (LS), lactulose (LA), palatinose-oligosaccharides (PAO), malto-oligosaccharides, gums and/or hydrolysates thereof, pectins and/or hydrolysates thereof, and combinations of the foregoing.

Non limiting examples of probiotics include: *Bifidobacterium, Lactobacillus, Lactococcus, Enterococcus, Streptococcus, Kluyveromyces, Saccharoymces, Candida,* in particular selected from the group consisting of *Bifidobacterium longum, Bifidobacterium lactis, Bifidobacterium animalis, Bifidobacterium breve, Bifidobacterium infantis, Bifidobac-*

*terium adolescentis, Lactobacillus acidophilus, Lactobacillus casei, Lactobacillus paracasei, Lactobacillus salivarius, Lactobacillus lactis, Lactobacillus rhamnosus, Lactobacillus johnsonii, Lactobacillus plantarum, Lactobacillus salivarius, Lactococcus lactis, Enterococcus faecium, Saccharomyces cerevisiae, Saccharomyces boulardii* or mixtures thereof, preferably selected from the group consisting of *Bifidobacterium longum* NCC3001 (ATCC BAA-999), *Bifidobacterium longum* NCC2705 (CNCM I-2618), *Bifidobacterium longum* NCC490 (CNCM I-2170), *Bifidobacterium lactis* NCC2818 (CNCM I-3446), *Bifidobacterium breve* strain A, *Lactobacillus paracasei* NCC2461 (CNCM I-2116), *Lactobacillus johnsonii* NCC533 (CNCM I-1225), *Lactobacillus rhamnosus* GG (ATCC53103), *Lactobacillus rhamnosus* NCC4007 (CGMCC 1.3724), *Enterococcus faecium* SF 68 (NCC2768; NCIMB10415), and combinations thereof.

Non limiting examples of Nucleotides include: cytidine monophosphate (CMP), uridine monophosphate (UMP), adenosine monophosphate (AMP), guanosine monophosphate (GMP), and combinations thereof.

Non limiting examples of vitamins and minerals include: vitamin A, vitamin B1, vitamin B2, vitamin B6, vitamin Bi2, vitamin E. vitamin K. vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, L-carnitine, and combinations thereof. Minerals are usually added in salt form.

Other suitable and desirable ingredients of human milk fortifier compositions, that may be employed in the human milk fortifier compositions of the invention, are described in guidelines issued by the Codex Alimentarius.

The human milk fortifier composition of the invention may be prepared in any way known in the art to prepare human milk fortifier compositions. It is well within the purview of the skilled person to decide on a method depending on the type of human milk fortifier in question e.g. powder or liquid. An exemplary method for preparing a human milk fortifier in accordance with the invention is set out below.

A human milk fortifier may be prepared, for example, by blending together lipid, protein, HMOs, and carbohydrate in appropriate proportions. If used, emulsifiers may be included in the blend at this stage. The vitamins and minerals may be added at this stage but are usually added later to avoid thermal degradation. Any lipophilic vitamins, such as vitamin A, D, E and K, and emulsifiers may be dissolved into the fat source prior to blending. Water, preferably water which has been subjected to reverse osmosis, may then be mixed in to a liquid mixture.

The liquid mixture may then be thermally treated to reduce bacterial loads. For example the liquid mixture may be rapidly heated to a temperature on the range of about 80° C. to about 110° C. for about 5 seconds to about 5 minutes. This may be carried out by steam injection or by heat exchanger, for example a plate heat exchanger.

The liquid mixture may then be cooled to about 60° C. to about 85° C., for example by flash cooling. The liquid mixture may then be homogenised, for example in two stages at about 7 MPa to about 40 MPa in the first stage and about 2 MPa to about 14 MPa in the second stage. The homogenised mixture may then be further cooled and any heat sensitive components, such as vitamins and minerals may be added. The pH of the homogenised mixture is conveniently standardised at this point.

The homogenized liquid mixture is then filled into suitable containers, preferably aseptically. However, the liquid composition may also be reported in the container. Suitable apparatus for carrying out filling of this nature is commercially available.

A human milk fortifier composition specifically tailored/adapted to fortify the breast milk of a primiparous women may be prepared from a human milk fortifier composition e.g. a human milk fortifier composition not specifically tailored to fortify the breast milk of a woman of a particularly parity e.g. primiparous or multiparous.

Accordingly, in another aspect of the present invention there is provided a method of preparing a human milk fortifier composition tailored to fortify the breast milk of a primiparous women, said method comprising the steps of: measuring out an appropriate amount of a human milk fortifier composition e.g. a human milk fortifier composition not specifically tailored to fortify the breast milk of a woman of a particular parity, and mixing it with an additive and/or a diluent e.g. one or more HMOs and/or water, so as to arrive at a human milk fortifier composition tailored to fortify the breast milk of a primiparous woman in accordance with the invention.

The additive may be a one or more HMO e.g. one or more HMO in a concentration such, that that when the additive is mixed with a human milk fortifier composition, and optionally a diluent, the resulting mixture is a human milk fortifier tailored to fortify the breast milk of a primiparous women, in accordance with the invention.

The additive may be a parity specific additive e.g. an additive marketed as specifically being for use by primiparous women.

In another aspect of the present invention there is provided a human milk fortifier in accordance with the invention, for use in fortifying human breast milk.

In an embodiment the human breastmilk is breastmilk from primiparous women.

In another aspect of the present invention there is provided a human milk fortifier composition in accordance with the invention, for use to provide an optimised amount of and/or to prevent a sub-optimal intake of one or more HMO to an infant or child who is the offspring of a primiparous mother.

An optimised amount of one or more HMO would be an amount equal to or greater than an amount e.g. the average amount, that an infant born to a multiparous woman would be considered to receive e.g. an amount of an HMO set out in table I, II or III included herein.

In another aspect of the present invention there is provided a human milk fortifier composition in accordance with the invention, for use in optimising the health and development and/or preventing the sub-optimal health and development e.g. growth and development of an infant or child who is the offspring of a primiparous mother.

The human milk fortifier compositions of the invention may not only optimise the health and development of an infant or child who is the offspring of a primiparous mother in the short term, but may also do so in the long term.

In another aspect of the present invention there is provided a human milk fortifier composition in accordance with the invention, for use in optimising the gut microbiota and/or preventing sub-optimal gut microbiota in an infant or child who is the offspring of a primiparous mother. HMOs are known to be important for the establishment of gut microbiota and therefore an optimal supply of HMOs may lead to an optimised gut microbiota.

In another aspect of the present invention there is provided the use of a human milk fortifier composition in accordance with the invention, in the manufacture of a composition for use in optimising the gut microbiota and/or health and development of an infant or child who is the offspring of a primiparous mother.

A non-optimal gut microbiota may be one showing presence of one or several pathobionts and/or opportunistic pathobionts and/or their toxins and/or virulence factors and/or antibiotic resistence genes. An optimal gut microbiota may be one not showing presence of one or several pathobionts and/or opportunistic pathobionts and/or their toxins and/or virulence factors and/or antibiotic resistence genes.

The human milk fortifier compositions of the invention may not only optimise gut microbiota composition and/or health and development short term, but may also do so in the long term.

Long term effects may only be evident in months or years e.g. 6 months, 9 months, 12 months, 5 years, 10 years, or 20 years In another aspect of the present invention there is provided the use of a human milk fortifier composition in accordance with the invention, to fortify human breast milk and to improve/prevent sub-optimal breastmilk quality wherein, said breastmilk is from a primiparous women.

The quality of breastmilk in a primparous woman may be considered sub-optimal if it comprises one or more HMO in a concentration less than that found in breastmilk from a multiparous woman e.g. in a concentration less than the average found in multiparous women.

In another aspect of the present invention there is provided the use of a human milk fortifier according to the invention in optimising and/or preventing the sub-optimal health and development and/or the gut flora composition in an infant or child who is the offspring of a primiparous mother.

As stated previously, some HMOs have also been linked to growth and body composition. In particular the intake of some HMOs have been positively linked to weight, lean mass and fat mass. In particular Lacto-N-Fucosylpentaose-II has been linked to increased size and in particular increased fat mass.

In another aspect of the present invention there is provided a human milk fortifier according to the invention for use in optimising and/or preventing the sub-optimal growth of an infant or child who is the offspring of a primiparous mother. In an embodiment the human milk fortifier according to the invention comprises Lacto-N-Lacto-N-Fucosyl-pentaose-II. In a more specific embodiment the human milk fortifier is tailored/adapted to fortify the human breast milk produced for an infant of up to 4 months of age, more specifically up to 1 month of age e.g. up to 2 weeks of age.

An infants or child's growth and development may be optimised if for example said infants or child's weight and length is within growth curves developed by the WHO.

Optimized growth refers to the criteria set by the WHO and they are depicted as charts of the growth of breastfed infants with the appropriate age- and sex-specific weight, length and head circumference. The WHO growth charts are international standards that show how healthy infants should grow, describing the growth of infants living in environments believed to support optimal growth.

If an infant or child's weight and length is within the growth curves developed by the WHO, and he/she has an appropriate distribution of lean and fat mass, it may be assumed that this child/infant is growing and developing in a healthy way, and may have a lower risk for later adverse metabolic outcomes.

Health and development and/or gut flora composition and/or growth may be optimised short term or long term.

A human milk fortifier tailored to fortify the breastmilk of a primiparous woman may be included in a nutritional system.

The term "nutritional system" as used herein refers to a collection of more than one synthetic nutritional compositions advertised or sold as part of the same product range e.g. a collection of human milk fortifiers and/or infant formulas sold under the same brand and adapted/tailored to the nutritional needs of infants born to different parity mothers e.g. primiparous or multiparous mothers. The synthetic nutritional compositions making up the nutritional system may be packaged individually e.g. in capsules or boxes. Said packages can be sold individually, grouped together e.g. wrapped by plastic film or combined in a box, or in a combination of these two ways. The nutritional system may also comprise synthetic nutritional compositions for children older than 12 months.

In a further aspect of the present invention there is provided a nutritional system comprising:

a. a human milk fortifier composition tailored to fortify the breast milk of a primiparous women, in accordance with the invention, and b. a human milk fortifier composition e.g. a human milk fortifier composition not specifically tailored to fortify the breast milk of a woman of a specific parity or specifically tailored to fortify the offspring of a multiparous woman, wherein, said human milk fortifier composition tailored to fortify the breast milk of a primiparous women comprises one or more HMO in a concentration higher than in the human milk fortifier composition e.g. human milk fortifier composition not specifically tailored to fortify the breast milk of a woman of a specific parity.

The concentration of one or HMO in the human milk fortifier tailored for a primiparous woman may be higher by any amount.

In an embodiment the human milk fortifier composition tailored for a primiparous woman comprises one or more HMO listed in table II in a higher amount. The higher amount may be an amount within the range given in table II for the HMO in question.

In a more specific embodiment the human milk fortifier composition tailored for a multiparous woman comprises one or more HMO listed in table III in a higher amount. The higher amount may be an amount within the range given in table III for the HMO in question.

It should be appreciated that all features of the present invention disclosed herein can be freely combined and that variations and modifications may be made without departing from the scope of the invention as defined in the claims. Furthermore, where known equivalents exist to specific features, such equivalents are incorporated as if specifically referred to in this specification.

There now follows a series of non-limiting examples that serve to illustrate the invention.

EXAMPLES

Example 1

Longitudinal Clinical Trial:

The present inventors designed a longitudinal clinical trial with lactating mothers with milk sampling at 2 days (V1), 17 days (V2), 30 days (V3) 60 days (V4), 90 days (V5), and 120 days (V6) postpartum. The milk samples were quantitatively analyzed for HMOs.

The data presented here is from a multi-center, exploratory study with the primary objective of characterizing key nutrient components in human breast milk. Healthy women of any ethnicity having decided to exclusively breast-feed their new born infant from birth to 4 months of infant's age were recruited during the last 3 months of pregnancy, and their infants were followed up until 4 months of age.

Breast milk samples were collected from the mother at the following days postpartum: 0-3 (V1), 17±3 (V2), 30±3 (V3), 60±5 days (V4), 90±5 days (V5) and 120±5 days (v6). Samples were collected after full expression from one breast using a milk pump (Symphony Breastpump, Medela), while the baby was fed on the other breast to produce a satisfactory let-down. All efforts were made to collect complete feed that included fore-, mid-, and hind-milk as a representation of one feed and to avoid within feed variation of lipid and other nutrient contents. Approximately 30 mL aliquot was separated into two conical 15 mL polypropylene tubes for analysis and the rest was returned to the mother to feed the infant. Samples collected for research were stored at −80° C. and shipped on dry ice for analyses to the Nestlé Research Center, Lausanne, Switzerland.

Information on parity (primiparous versus multiparous) were collected along with other maternal sociodemographic and anthropometric characteristics. The concentrations of HMOs were measured in breast milk at all the time points as described below.

HMO were analysed by ulta high performance liquid chromatography (UHPLC) with fluorescence detection (FLD) after labelling with anthranilamide (2AB). Milk samples (50 µL) or HMO standard solutions (50 µL) were mixed with laminaritriose solution (0.5 µmol/mL; 50 µL) used as internal standard. 2AB labelling solution (2AB, 0.35 mol/L+sodium cyanoborohydride, 1.0 mol/L in DMSO containing 30% acetic acid; 200 µL) was added and the solution heated at 65° C. for 2 h. After 2 h the samples (and standards) were cooled to 4° C. for 10 min and diluted with a solution of acetonitrile/water (75/25; 600 µL). After mixing well, the solutions were placed in a centrifuge (10000×g; 5 min) to remove particulates and the supernatant transferred to vials suitable for the UHPLC autosampler. The HMO were separated on a Waters BEH Glycan column (2.1×150 mm, 1.7 µm), preceded by a Waters BEH Amide Pre-column (2.1×5.0 mm, 1.7 µm) plumbed in to the system in such a way to act as a trapping column for removal of the excess labelling reagents (previously described by Benet & Austin, 2011) using the gradient described below. The 2AB-labelled oligosaccharides were detected by monitoring their fluorescence using λex=330 nm and λem=420 nm.

Quantification was performed against standards of the genuine HMO for 2'FL, 3FL, A-tetrasaccharide, 3'SL, 6'SL, LNT, LNnT, LNFP-I, LNFP-V, and LNnFP. All other HMO were quantified against maltotriose assuming an equimolar response of the 2AB-labelled oligosaccharides.

The following conditions were used for Separation of HMO on a BEH Glycan Column:

| Time | | Mobile phase* | | 10 ports valve | |
|---|---|---|---|---|---|
| (min) | Flow (mL/min) | % A | % B | position | Comment |
| 0.0 | 0.5 | 95.0 | 5.0 | 10-1 | Inject 5.0 μL Sample loading on trapping col. |
| 2.3 | 0.5 | 95.0 | 5.0 | 10-1 | Switch valve - start acquisition |
| 2.5 | 0.5 | 90.0 | 10.0 | 1-2 | |
| 4.9 | 0.5 | 90.0 | 10.0 | 1-2 | Elution |
| 32.1 | 0.5 | 82.0 | 18.0 | 1-2 | |
| 48.1 | 0.5 | 80.5 | 19.5 | 1-2 | |
| 61.5 | 0.5 | 78.0 | 22.0 | 1-2 | |
| 89.0 | 0.5 | 74.6 | 25.4 | 1-2 | |
| 89.5 | 0.4 | 30.0 | 70.0 | 1-2 | Washing analytical col. |
| 92.0 | 0.4 | 30.0 | 70.0 | 1-2 | |
| 93.0 | 0.4 | 90.0 | 10.0 | 1-2 | Re-equilibrate analytical col. |
| 98.0 | 0.5 | 90.0 | 10.0 | 10-1 | Autozero/switch valve/ stop acquisition |
| 99.0 | 0.5 | 95.0 | 5.0 | 10-1 | Equilibrate trapping col. |
| 99.5 | 0.5 | 95.0 | 5.0 | 10-1 | End |

Benet, T. & Austin, S. (2011) On-line clean-up for 2-aminobenzamide-labeled oligosaccharides, Anal. Chem. 414: 166-168. http://dx.doi.org/10.1016/j.ab.2011.03.002.

The results of the compositional analysis were then subject to a statistical analysis.

A linear mixed model was used to model each HMO in which visit, parity, country and interaction between visit and parity were used as fixed effects. The within subject variability due to longitudinal repeat measures were taken care of in the model by declaring subject as a random effect.

The following statistical model was employed:
HMO~Timepoint*Parity+Country+e

Timepoint, Parity and Country refers to the fixed effects of the model and takes into consideration the interactions between timepoint and parity.

e refers to the random effect of the model which controls for within subject variability.

Figure 2:
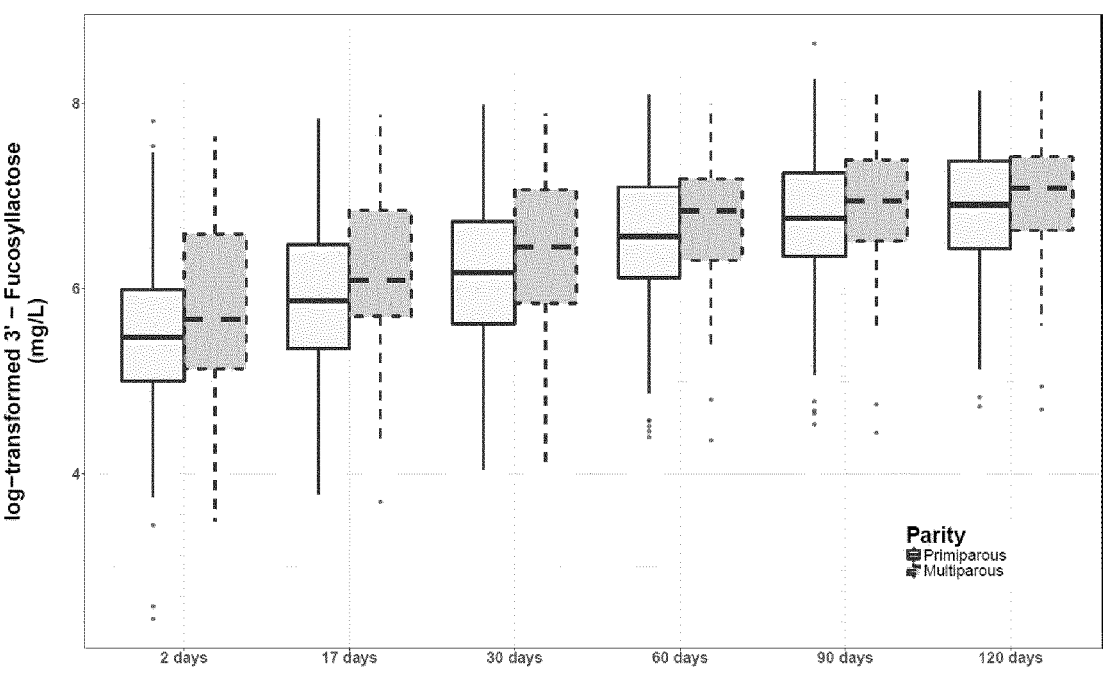
FIG. 2 is a graphical representation of the 3-Fucosyllactose concentration found in HM by delivery mode at 2 days (V1), 17 days (V2), 30 days (V3) 60 days (V4), 90 days (V5), and 120 days (V6) postpartum.
Figure 3:
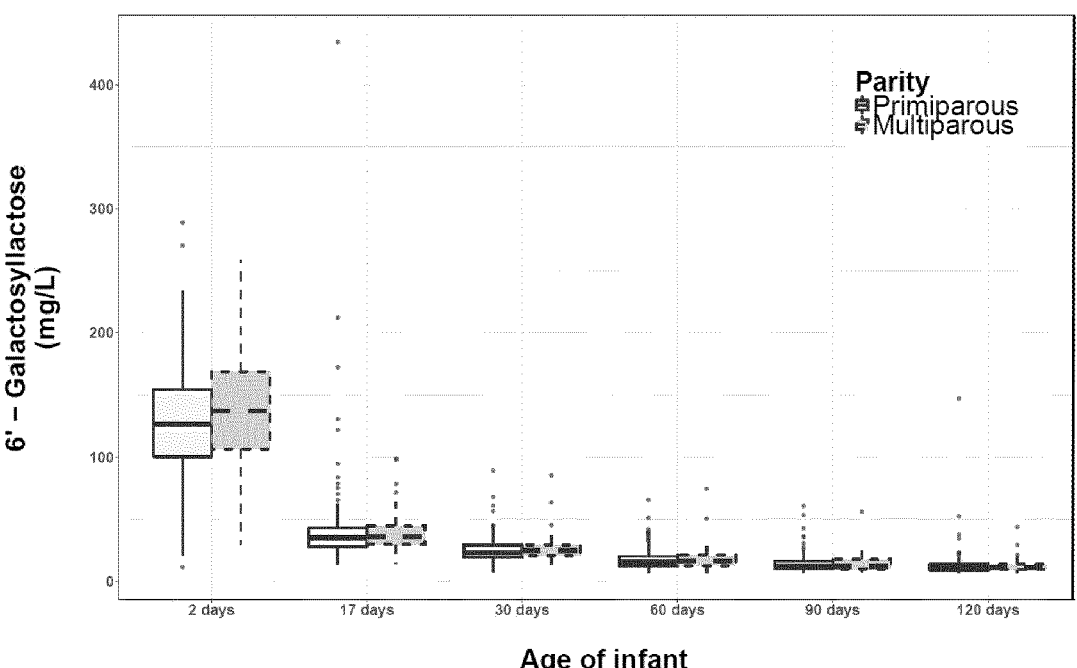
FIG. 3 is a graphical representation of the 6'Galactosyllactose concentration found in HM by delivery mode at 2 days (V1), 17 days (V2), 30 days (V3) 60 days (V4), 90 days (V5), and 120 days (V6) postpartum.
Figure 4:
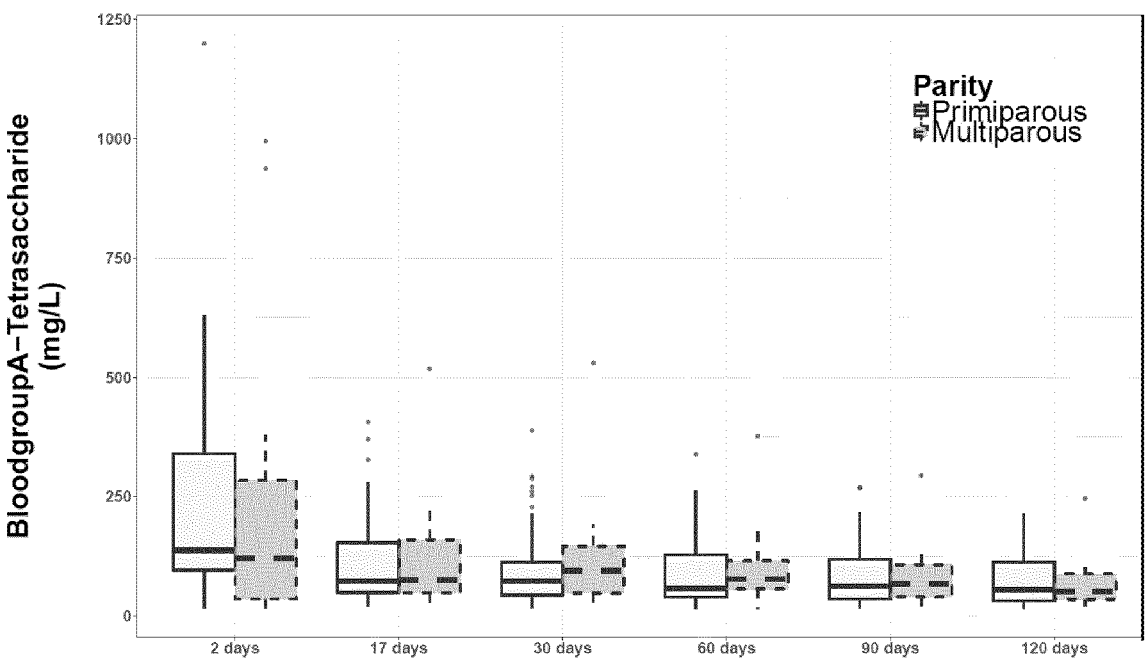
FIG. 4 is a graphical representation of the Blood group A Tetrasaccharide concentration found in HM by delivery mode at 2 days (V1), 17 days (V2), 30 days (V3) 60 days (V4), 90 days (V5), and 120 days (V6) postpartum.
Figure 5:
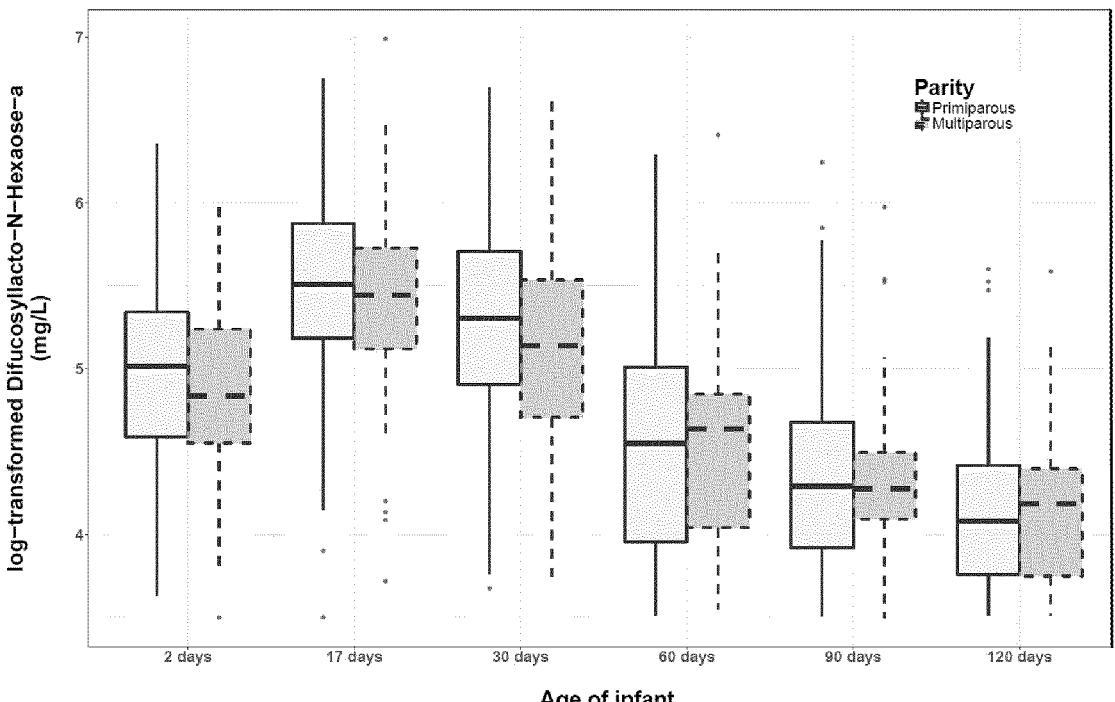
FIG. 5 is a graphical representation of the Difucosyllacto-N-Hexose-A concentration found in HM by delivery mode at 2 days (V1), 17 days (V2), 30 days (V3) 60 days (V4), 90 days (V5), and 120 days (V6) postpartum.
Figure 6:
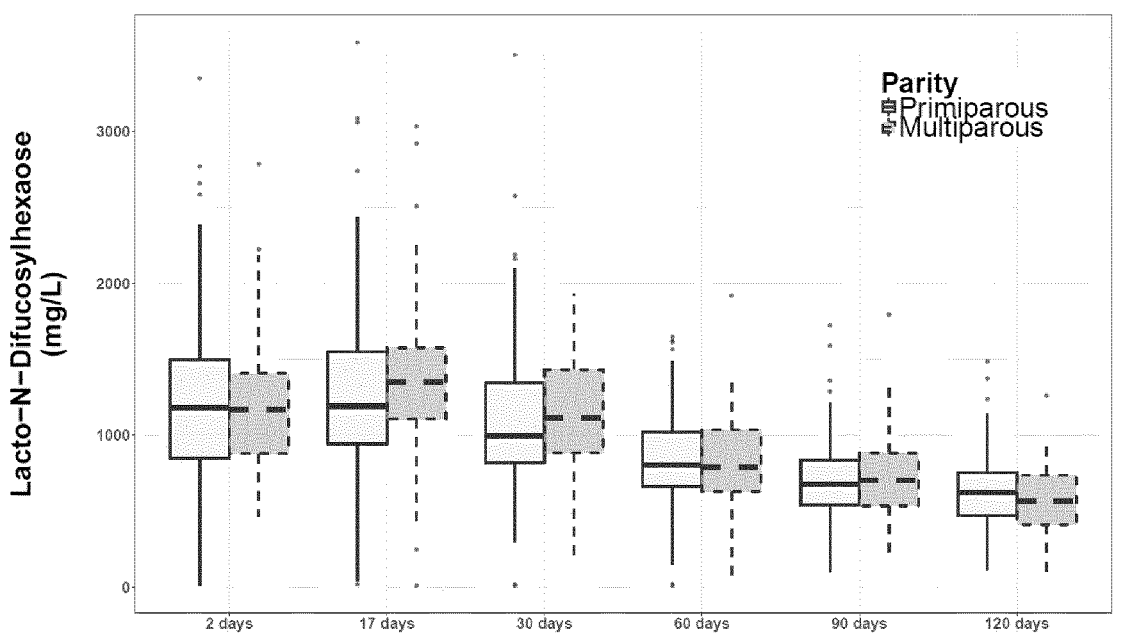
FIG. 6 is a graphical representation of the Lacto-N-Difucosylhexose concentration found in HM by delivery mode at 2 days (V1), 17 days (V2), 30 days (V3) 60 days (V4), 90 days (V5), and 120 days (V6) postpartum.
Figure 7:
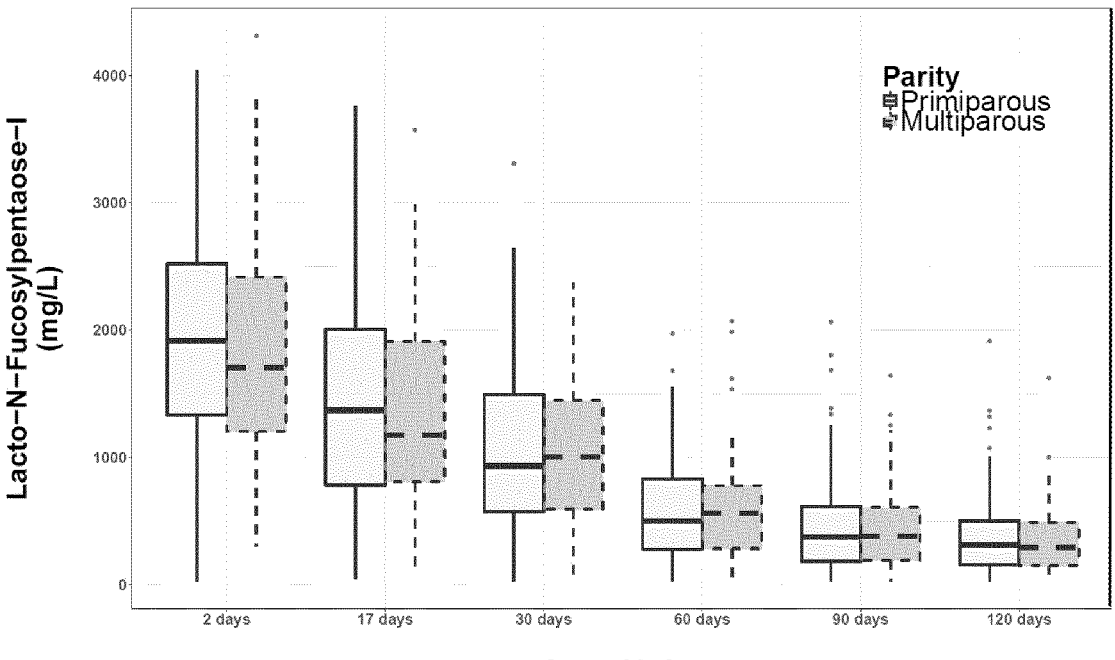
FIG. 7 is a graphical representation of the Lacto-N-Fucosylpentaose-I concentration found in HM by delivery mode at 2 days (V1), 17 days (V2), 30 days (V3) 60 days (V4), 90 days (V5), and 120 days (V6) postpartum.
Figure 8:
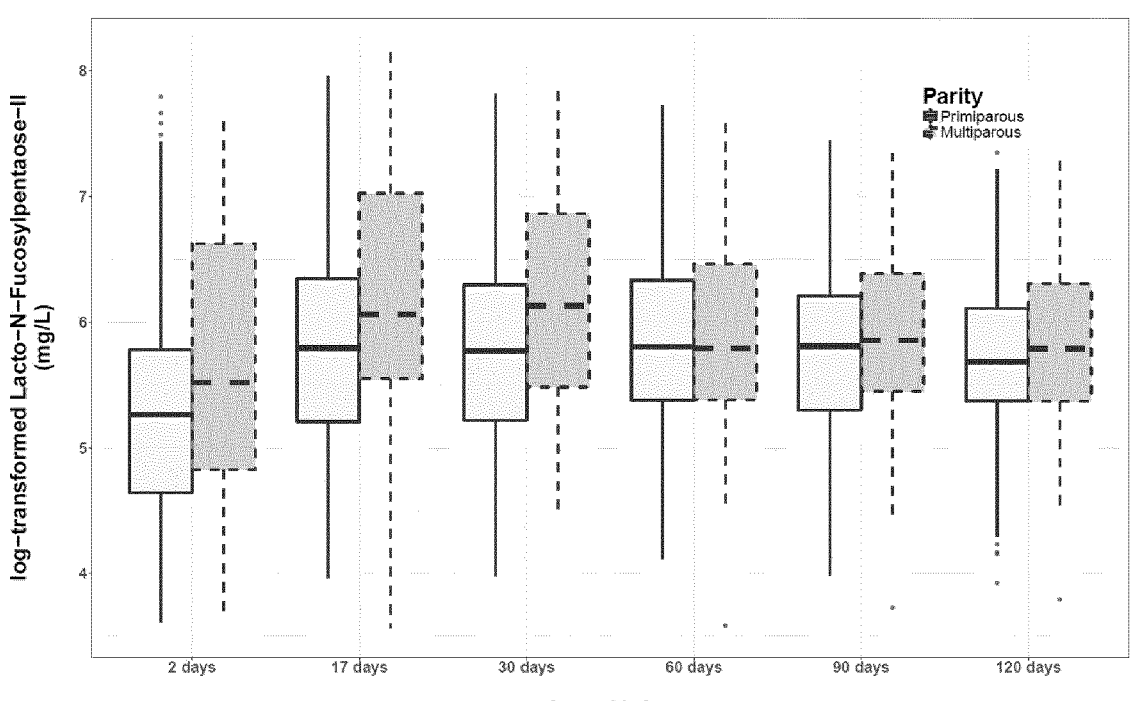
FIG. 8 is a graphical representation of the Lacto-N-Fucosylpentaose-II concentration found in HM by delivery mode at 2 days (V1), 17 days (V2), 30 days (V3) 60 days (V4), 90 days (V5), and 120 days (V6) postpartum.
Figure 9:
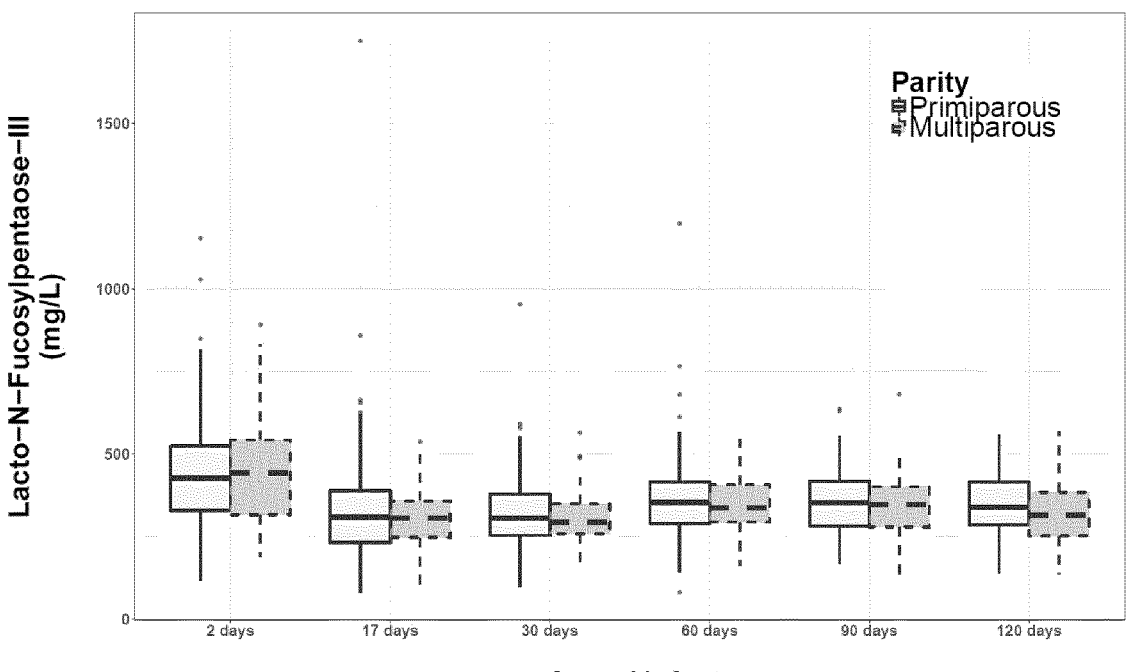
FIG. 9 is a graphical representation of the Lacto-N-Fucosylpentaose-III concentration found in HM by delivery mode at 2 days (V1), 17 days (V2), 30 days (V3) 60 days (V4), 90 days (V5), and 120 days (V6) postpartum.
Figure 10:
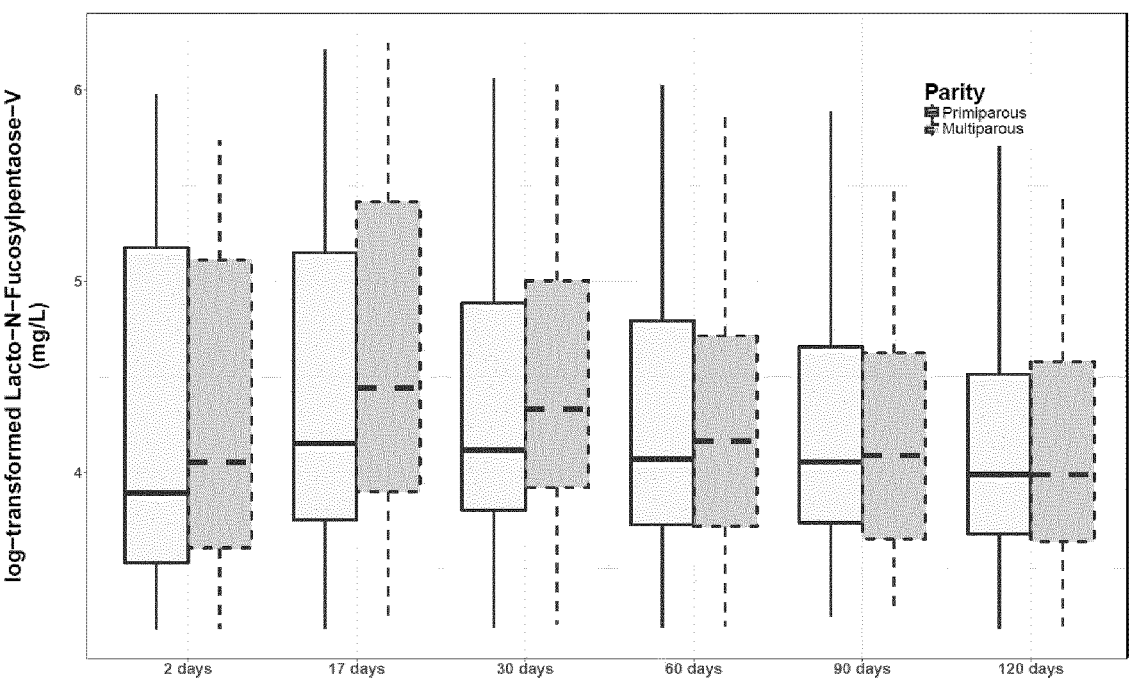
FIG. 10 is a graphical representation of the Lacto-N-Fucosylpentaose-V concentration found in HM by delivery mode at 2 days (V1), 17 days (V2), 30 days (V3) 60 days (V4), 90 days (V5), and 120 days (V6) postpartum.
Figure 11:
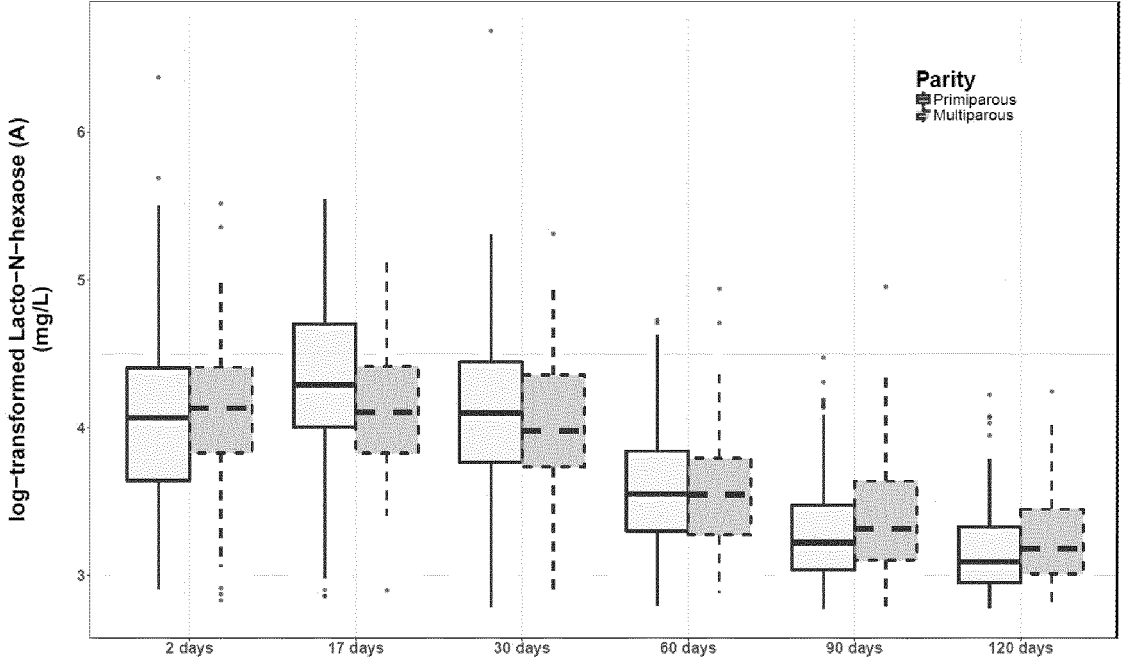
FIG. 11 is a graphical representation of the Lacto-N-hexaose A concentration found in HM by delivery mode at 2 days (V1), 17 days (V2), 30 days (V3) 60 days (V4), 90 days (V5), and 120 days (V6) postpartum.
Figure 12:
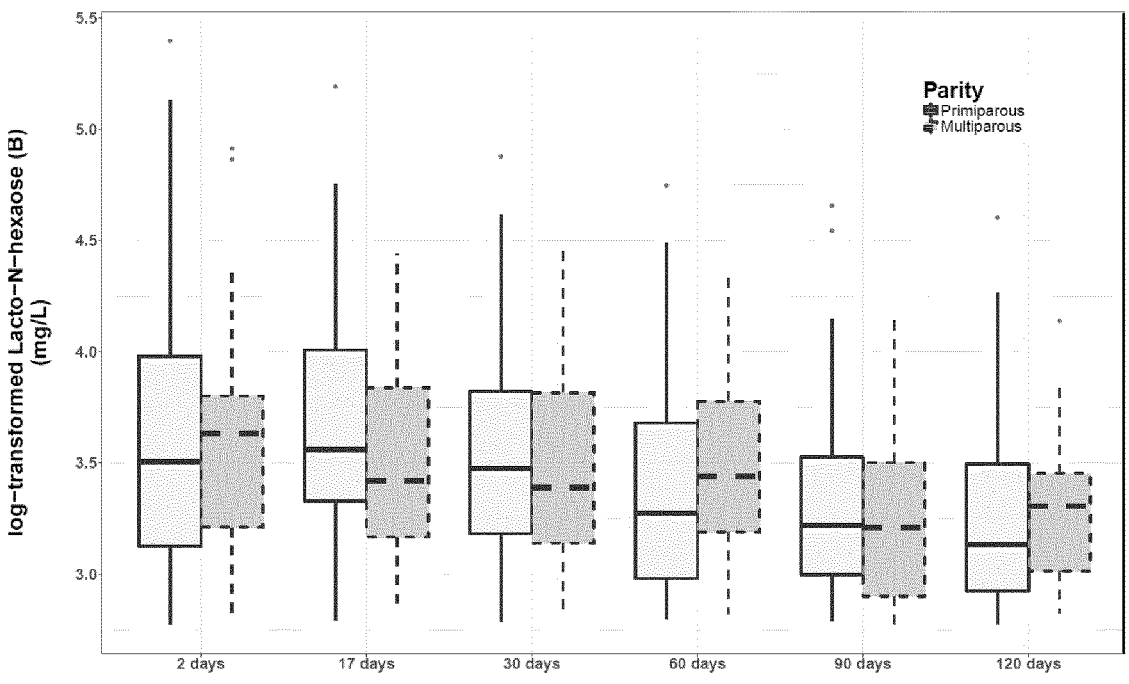
FIG. 12 is a graphical representation of the Lacto-N-hexaose B concentration found in HM by delivery mode at 2 days (V1), 17 days (V2), 30 days (V3) 60 days (V4), 90 days (V5), and 120 days (V6) postpartum.
Figure 13:
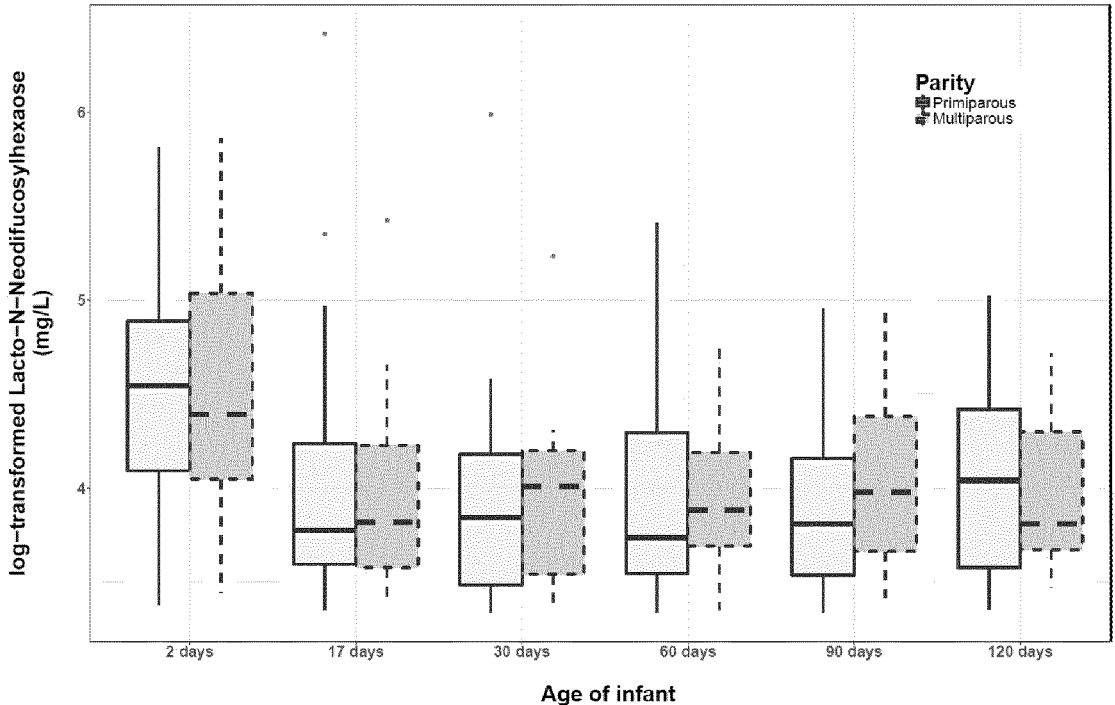
FIG. 13 is a graphical representation of the Lacto-N-Neodifucosylhexose concentration found in HM by delivery mode at 2 days (V1), 17 days (V2), 30 days (V3) 60 days (V4), 90 days (V5), and 120 days (V6) postpartum.
Figure 14:
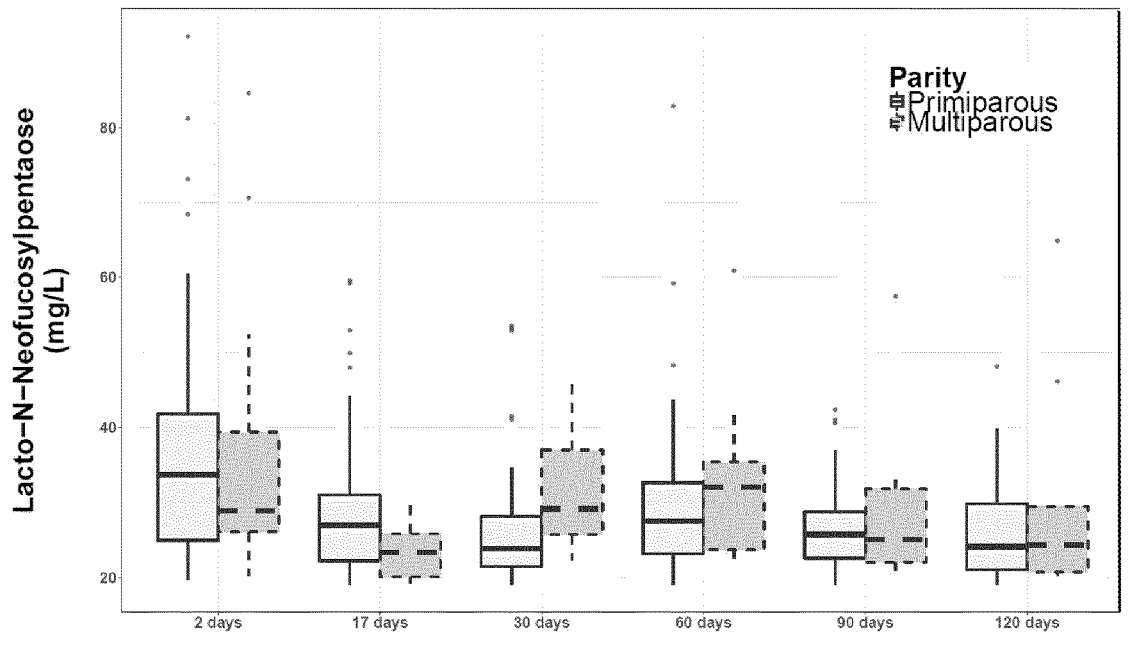
FIG. 14 is a graphical representation of the Lacto-N-Neofucosylpentaose concentration found in HM by delivery mode at 2 days (V1), 17 days (V2), 30 days (V3) 60 days (V4), 90 days (V5), and 120 days (V6) postpartum.
Figure 15:
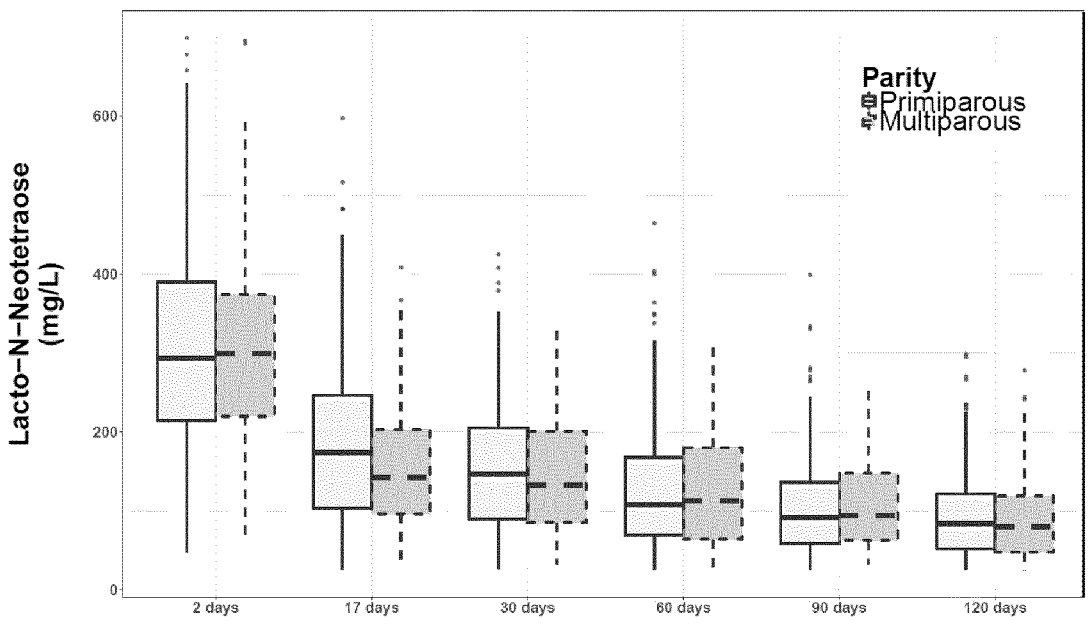
FIG. 15 is a graphical representation of the Lacto-N-Neotetraose concentration found in HM by delivery mode at 2 days (V1), 17 days (V2), 30 days (V3) 60 days (V4), 90 days (V5), and 120 days (V6) postpartum.
Figure 16:
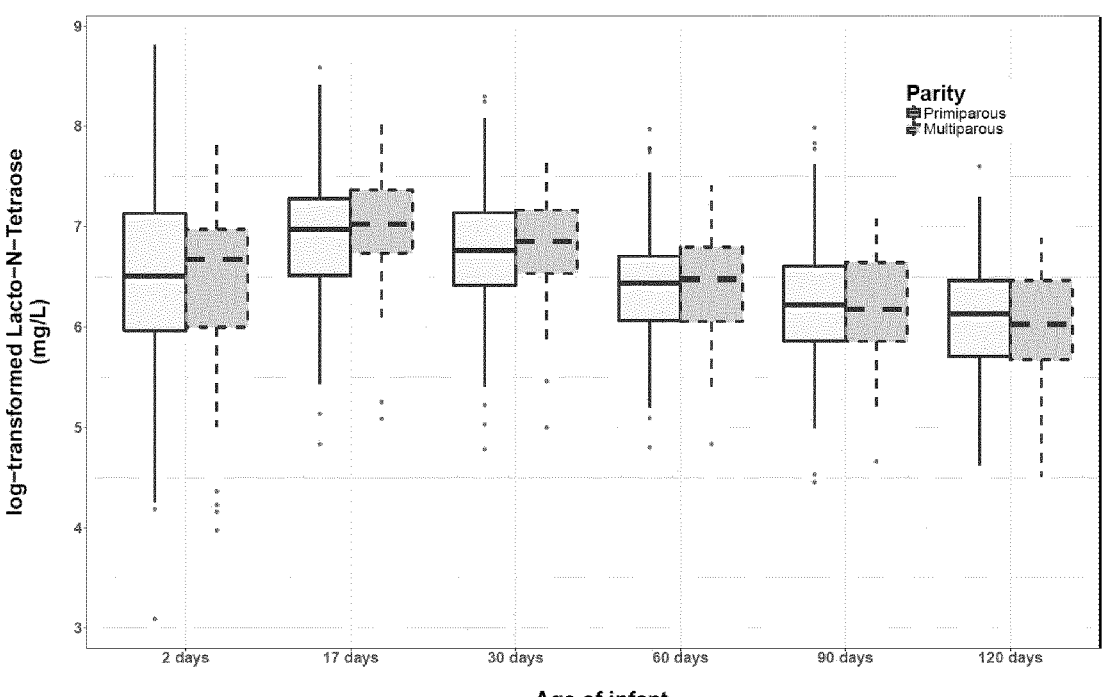
FIG. 16 is a graphical representation of the Lacto-N-Tetraose concentration found in HM by delivery mode at 2 days (V1), 17 days (V2), 30 days (V3) 60 days (V4), 90 days (V5), and 120 days (V6) postpartum.
Figure 17:
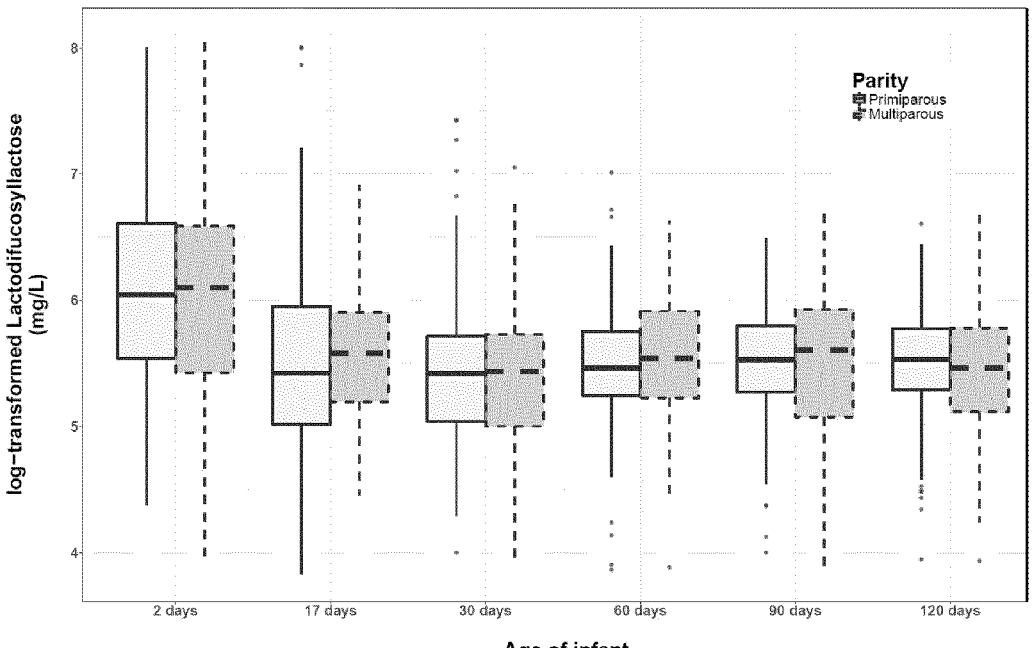
FIG. 17 is a graphical representation of the Lactodifucosyllactose concentration found in HM by delivery mode at 2 days (V1), 17 days (V2), 30 days (V3) 60 days (V4), 90 days (V5), and 120 days (V6) postpartum.
Figure 18:
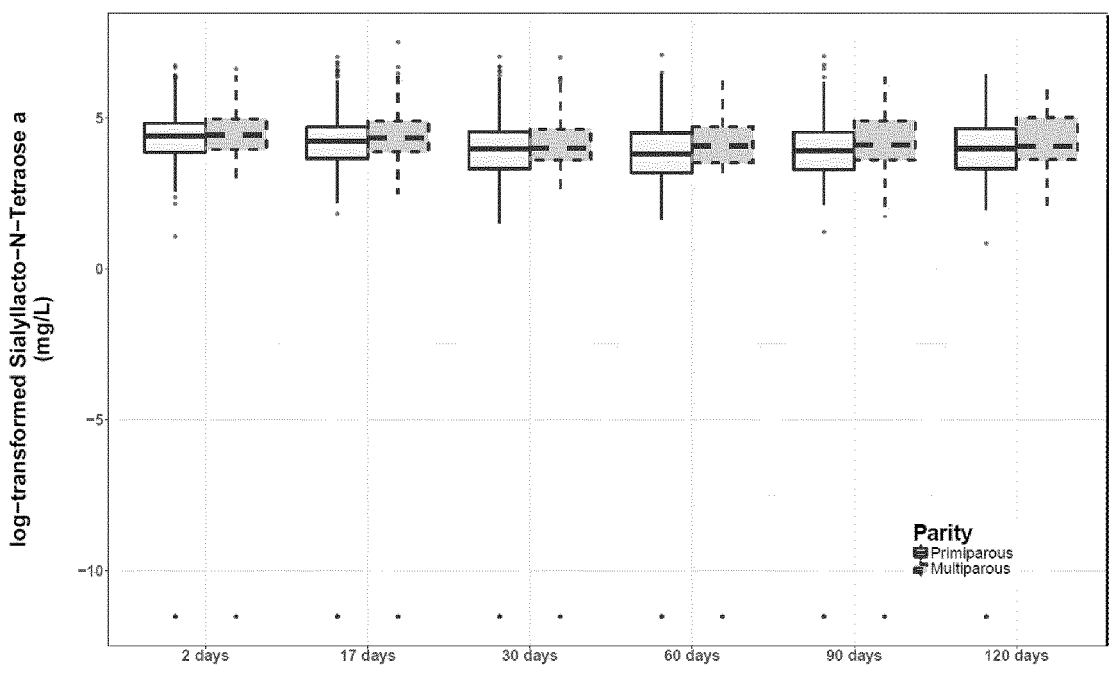
FIG. 18 is a graphical representation of the Sialyllacto-N-Tetraose a concentration found in HM by delivery mode at 2 days (V1), 17 days (V2), 30 days (V3) 60 days (V4), 90 days (V5), and 120 days (V6) postpartum.
Figure 19:
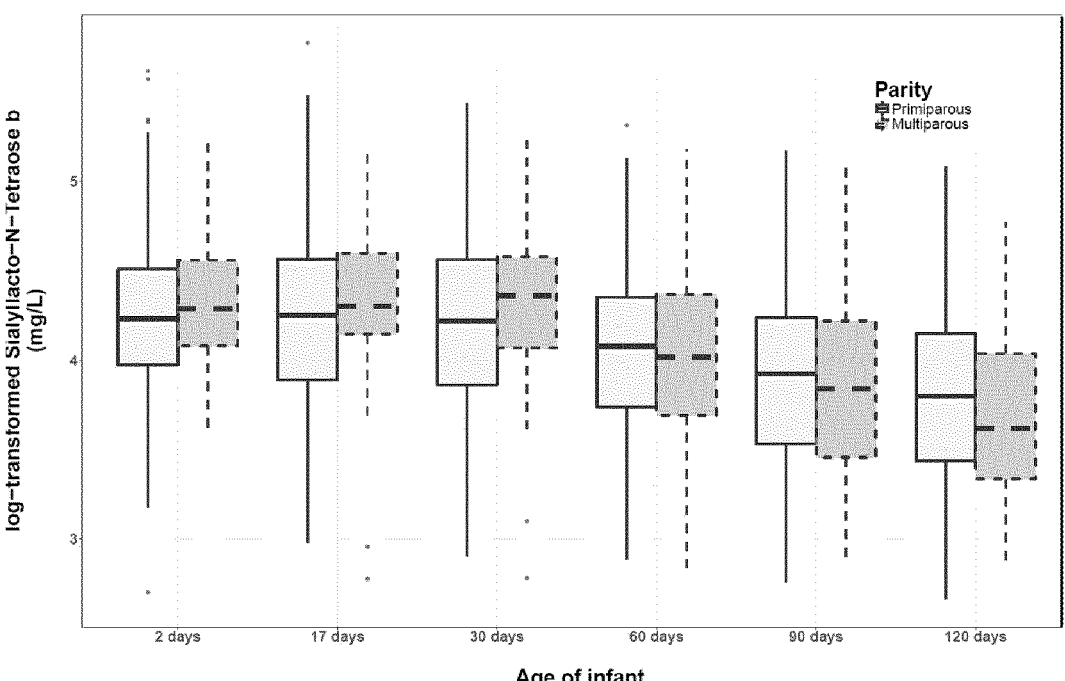
FIG. 19 is a graphical representation of the Sialyllacto-N-Tetraose b concentration found in HM by delivery mode at 2 days (V1), 17 days (V2), 30 days (V3) 60 days (V4), 90 days (V5), and 120 days (V6) postpartum.

The results of the Statistical analysis (statistical inference) are show in in tables IV-XXIV and FIGS. 1 to 19. P value tables are given in the table beneath the compound and results to which they refer.

TABLE IV

| param | unit | DELITYP | visit | N | mean | sd | median | q1.25% | q3.75% | min | max |
|---|---|---|---|---|---|---|---|---|---|---|---|
| 2'-Fucosyllactose | mg/L | UNIQUE | V1 | 138 | 4006.75 | 1517.06 | 3767.15924 | 3080.24 | 4761.75 | 175.61 | 9589.39 |
| 2'-Fucosyllactose | mg/L | UNIQUE | V2 | 171 | 2715.34 | 976.99 | 2715.344 | 2018.57 | 3409.34 | 88.07 | 5848.58 |
| 2'-Fucosyllactose | mg/L | UNIQUE | V3 | 149 | 2517.85 | 873 | 2442.034 | 1959.83 | 3128.59 | 325.18 | 4409.01 |
| 2'-Fucosyllactose | mg/L | UNIQUE | V4 | 134 | 2122.26 | 813.22 | 2005.177885 | 1565.84 | 2658.09 | 189.51 | 4026.61 |
| 2'-Fucosyllactose | mg/L | UNIQUE | V5 | 129 | 1819.24 | 721.8 | 1706.086 | 1335.71 | 2347.2 | 125.08 | 3820.31 |
| 2'-Fucosyllactose | mg/L | UNIQUE | V6 | 122 | 1628.42 | 675.81 | 1526.19981 | 1188.35 | 2071.5 | 124.18 | 3608.3 |
| 2'-Fucosyllactose | mg/L | WITH SIBLINGS | V1 | 48 | 4386.09 | 1736.73 | 4289.65 | 3228.69 | 5129.99 | 1100.93 | 9498.58 |
| 2'-Fucosyllactose | mg/L | WITH SIBLINGS | V2 | 54 | 2587.29 | 918.13 | 2426.2 | 2041.13 | 3043.69 | 533.88 | 5307.33 |
| 2'-Fucosyllactose | mg/L | WITH SIBLINGS | V3 | 52 | 2442.11 | 899.71 | 2320.87 | 1799.47 | 2927.19 | 399.74 | 4485.03 |
| 2'-Fucosyllactose | mg/L | WITH SIBLINGS | V4 | 50 | 2110.74 | 738.82 | 2022.34 | 1553.69 | 2605.41 | 295.32 | 3824.97 |
| 2'-Fucosyllactose | mg/L | WITH SIBLINGS | V5 | 48 | 1894.55 | 712.41 | 1817.36 | 1381.61 | 2359.19 | 295.69 | 3621.32 |
| 2'-Fucosyllactose | mg/L | WITH SIBLINGS | V6 | 46 | 1651.26 | 625.97 | 1621.59 | 1210.65 | 2096.49 | 159.25 | 2986.33 |

TABLE IVa

| Visit | Estimate | SE | pvalue |
|---|---|---|---|
| V1 | 382.33277 | 163.9708 | 0.01989229 |
| V2 | -134.65750 | 159.1302 | 0.39761651 |
| V3 | -141.87577 | 161.5152 | 0.37991228 |
| V4 | -152.21420 | 163.7197 | 0.35271384 |
| V5 | -90.77581 | 165.3151 | 0.58312380 |
| V6 | -169.04976 | 166.9656 | 0.31152596 |

5

TABLE V

| param | unit | DELITYP | visit | N | mean | sd | median | q1.25% | q3.75% | min | max |
|---|---|---|---|---|---|---|---|---|---|---|---|
| 3 - Fucosyl-lactose | mg/L | UNIQUE | V1 | 172 | 385.4664991 | 415.5565524 | 237.86708 | 148.2090175 | 398.264 | 11.41228 | 2468.566 |
| 3 - Fucosyl-lactose | mg/L | UNIQUE | V2 | 214 | 553.0388569 | 521.3096535 | 354.48191 | 210.854 | 649.0720075 | 43.78025 | 2537.227 |
| 3 - Fucosyl-lactose | mg/L | UNIQUE | V3 | 189 | 674.7012092 | 574.5232909 | 478.311 | 275.97259 | 831.444 | 57.45987 | 2921.70036 |
| 3 - Fucosyl-lactose | mg/L | UNIQUE | V4 | 173 | 928.8239356 | 668.6906753 | 708.247 | 454.831 | 1209.657 | 81.083 | 3278.66994 |
| 3 - Fucosyl-lactose | mg/L | UNIQUE | V5 | 166 | 1086.633496 | 757.0840296 | 864.07916 | 571.399 | 1410.950658 | 93.05087 | 5715.55268 |
| 3 - Fucosyl-lactose | mg/L | UNIQUE | V6 | 158 | 1160.839661 | 682.5011962 | 998.615 | 621.92175 | 1606.707478 | 112.962 | 3443.91 |
| 3 - Fucosyl-lactose | mg/L | WITH SIBLINGS | V1 | 64 | 519.4932994 | 531.8511225 | 289.8366 | 169.507215 | 728.1158025 | 32.664 | 2078.125 |
| 3 - Fucosyl-lactose | mg/L | WITH SIBLINGS | V2 | 75 | 711.2907307 | 628.9001769 | 441.16265 | 299.365935 | 939.567185 | 40.313 | 2638.36113 |
| 3 - Fucosyl-lactose | mg/L | WITH SIBLINGS | V3 | 71 | 839.9917762 | 678.0150354 | 633.44927 | 345.148815 | 1173.1234 | 58.9511 | 2670.76 |
| 3 - Fucosyl-lactose | mg/L | WITH SIBLINGS | V4 | 69 | 1073.123048 | 742.4445881 | 937.19072 | 548.39844 | 1322.12 | 78.17999 | 2963.532 |
| 3 - Fucosyl-lactose | mg/L | WITH SIBLINGS | V5 | 67 | 1271.12714 | 815.3119729 | 1038.34043 | 672.70648 | 1623.508555 | 84.97374 | 3499.62987 |
| 3 - Fucosyl-lactose | mg/L | WITH SIBLINGS | V6 | 65 | 1327.515428 | 787.8852486 | 1196.455 | 757.36606 | 1674.172 | 109.34912 | 3653.15978 |

45

TABLE VI

| Visit | Estimate | SE | pvalue |
|---|---|---|---|
| V1 | 1.304577 | 1.116104 | 0.01561971 |
| V2 | 1.270724 | 1.114634 | 0.02742312 |
| V3 | 1.249569 | 1.115363 | 0.04146459 |
| V4 | 1.189985 | 1.1157696 | 0.11261200 |
| V5 | 1.180027 | 1.116120 | 0.13207376 |
| V6 | 1.169900 | 1.116435 | 0.15445449 |

50

TABLE VII

| param | unit | DELITYP | visit | N | mean | sd | median | q1.25% |
|---|---|---|---|---|---|---|---|---|
| 6' - Galactosyllactose | mg/L | UNIQUE | V1 | 173 | 128.9940719 | 47.46982 | 126.3577251 | 100.3019356 |
| 6' - Galactosyllactose | mg/L | UNIQUE | V2 | 214 | 40.43950928 | 34.32453 | 34.93363996 | 27.84100032 |
| 6' - Galactosyllactose | mg/L | UNIQUE | V3 | 190 | 25.44688677 | 9.806509 | 23.17565201 | 19.42520304 |
| 6' - Galactosyllactose | mg/L | UNIQUE | V4 | 173 | 17.59295944 | 8.05038 | 15.74108242 | 12.47470354 |

TABLE VII-continued

| param | unit | DELITYP | visit | N | mean | sd | median | q1.25% |
|---|---|---|---|---|---|---|---|---|
| 6'-Galactosyllactose | mg/L | UNIQUE | V5 | 161 | 14.34098883 | 7.479945 | 12.4716807 | 10.16207027 |
| 6'-Galactosyllactose | mg/L | UNIQUE | V6 | 147 | 13.07171018 | 12.49064 | 10.80183408 | 8.87243724 |
| 6'-Galactosyllactose | mg/L | WITH SIBLINGS | V1 | 64 | 138.9473035 | 46.10431 | 137.0616097 | 106.2274385 |
| 6'-Galactosyllactose | mg/L | WITH SIBLINGS | V2 | 74 | 39.1280561 | 15.2604 | 35.89756199 | 29.57195798 |
| 6'-Galactosyllactose | mg/L | WITH SIBLINGS | V3 | 71 | 26.40557425 | 10.78379 | 24.87935762 | 20.45856916 |
| 6'-Galactosyllactose | mg/L | WITH SIBLINGS | V4 | 67 | 18.19156281 | 9.872754 | 16.27389683 | 12.55895567 |
| 6'-Galactosyllactose | mg/L | WITH SIBLINGS | V5 | 65 | 14.43524793 | 7.081825 | 12.01385773 | 9.826798342 |
| 6'-Galactosyllactose | mg/L | WITH SIBLINGS | V6 | 61 | 12.24780197 | 5.723957 | 10.93564962 | 9.250831953 |

| param | unit | DELITYP | visit | q3.75% | min | max |
|---|---|---|---|---|---|---|
| 6'-Galactosyllactose | mg/L | UNIQUE | V1 | 154.0188447 | 11.28896522 | 288.7462236 |
| 6'-Galactosyllactose | mg/L | UNIQUE | V2 | 42.73797305 | 13.62127529 | 434.3117534 |
| 6'-Galactosyllactose | mg/L | UNIQUE | V3 | 29.16381402 | 7.291378016 | 88.87964314 |
| 6'-Galactosyllactose | mg/L | UNIQUE | V4 | 19.96432738 | 6.838216821 | 65.30491452 |
| 6'-Galactosyllactose | mg/L | UNIQUE | V5 | 16.09249333 | 6.514312709 | 60.46113641 |
| 6'-Galactosyllactose | mg/L | UNIQUE | V6 | 13.69842265 | 6.482990651 | 146.8862427 |
| 6'-Galactosyllactose | mg/L | WITH SIBLINGS | V1 | 168.6023267 | 29.69176747 | 258.227941 |
| 6'-Galactosyllactose | mg/L | WITH SIBLINGS | V2 | 44.46636476 | 14.16036621 | 98.52362497 |
| 6'-Galactosyllactose | mg/L | WITH SIBLINGS | V3 | 29.31283111 | 12.8653756 | 85.11500318 |
| 6'-Galactosyllactose | mg/L | WITH SIBLINGS | V4 | 21.00367988 | 6.668169255 | 74.29089736 |
| 6'-Galactosyllactose | mg/L | WITH SIBLINGS | V5 | 17.61023478 | 7.170486535 | 55.96674008 |
| 6'-Galactosyllactose | mg/L | WITH SIBLINGS | V6 | 13.5930005 | 6.800981073 | 43.62702667 |

TABLE VIII

| param | unit | DELITYP | visit | N | mean | sd | median | q1.25% | q3.75% | min | max |
|---|---|---|---|---|---|---|---|---|---|---|---|
| BloodgroupA-Tetrasaccharide | mg/L | UNIQUE | V1 | 62 | 218.3100965 | 199.91 | 137.645 | 96.501955 | 339.8993275 | 16.70496 | 1198.809 |
| BloodgroupA-Tetrasaccharide | mg/L | UNIQUE | V2 | 74 | 108.9752193 | 87.04024 | 73.80618 | 49.86775 | 153.6967025 | 20.571 | 406.27274 |
| BloodgroupA-Tetrasaccharide | mg/L | UNIQUE | V3 | 67 | 101.1101424 | 80.23 | 74.20433 | 44.016415 | 113.37141 | 18.04427 | 388.594 |
| BloodgroupA-Tetrasaccharide | mg/L | UNIQUE | V4 | 59 | 89.30594305 | 70.23909 | 58.313 | 39.61766 | 128.653605 | 15.067 | 338.339 |
| BloodgroupA-Tetrasaccharide | mg/L | UNIQUE | V5 | 53 | 85.24264679 | 64.13099 | 62.96622 | 35.832 | 119.28 | 17.93698 | 269.711 |
| BloodgroupA-Tetrasaccharide | mg/L | UNIQUE | V6 | 48 | 78.27483 | 59.40327 | 54.919015 | 32.0109175 | 113.239025 | 15.08493 | 214.554 |
| BloodgroupA-Tetrasaccharide | mg/L | WITH SIBLINGS | V1 | 18 | 224.7452844 | 294.2047 | 120.82463 | 35.8747 | 284.1568725 | 16.98872 | 993.8064 |
| BloodgroupA-Tetrasaccharide | mg/L | WITH SIBLINGS | V2 | 18 | 112.8672322 | 117.5963 | 75.509785 | 48.8410875 | 159.6912825 | 15.208 | 517.54089 |
| BloodgroupA-Tetrasaccharide | mg/L | WITH SIBLINGS | V3 | 17 | 123.0597341 | 119.73 | 95.024 | 48.21369 | 146.4399 | 17.56554 | 529.36 |
| BloodgroupA-Tetrasaccharide | mg/L | WITH SIBLINGS | V4 | 17 | 98.30965941 | 83.89327 | 77.95666 | 57.209 | 115.87755 | 16.361 | 376.29878 |
| BloodgroupA-Tetrasaccharide | mg/L | WITH SIBLINGS | V5 | 15 | 85.03220533 | 69.04539 | 67.01464 | 40.436035 | 107.519645 | 19.39048 | 294.134 |
| BloodgroupA-Tetrasaccharide | mg/L | WITH SIBLINGS | V6 | 15 | 70.211992 | 56.09551 | 51.54932 | 35.436115 | 88.07794 | 21.94559 | 246.20116 |

TABLE IX

| param | unit | DELITYP | visit | N | mean | sd | median | q1.25% |
|---|---|---|---|---|---|---|---|---|
| Difucosyllacto-N-Hexaose-a | mg/L | UNIQUE | V1 | 125 | 166.66388 | 100.4515893 | 150.4463936 | 98.1823431 |
| Difucosyllacto-N-Hexaose-a | mg/L | UNIQUE | V2 | 167 | 282.797729 | 161.029439 | 247.1195693 | 178.1422564 |
| Difucosyllacto-N-Hexaose-a | mg/L | UNIQUE | V3 | 144 | 234.3063825 | 147.4320416 | 200.969341 | 134.8599339 |
| Difucosyllacto-N-Hexaose-a | mg/L | UNIQUE | V4 | 118 | 119.7067972 | 96.5242152 | 94.42787799 | 52.25253247 |
| Difucosyllacto-N-Hexaose-a | mg/L | UNIQUE | V5 | 78 | 98.51640533 | 80.74105435 | 72.88240189 | 50.34510842 |
| Difucosyllacto-N-Hexaose-a | mg/L | UNIQUE | V6 | 58 | 74.99587394 | 51.32117734 | 59.0456174 | 42.88833806 |
| Difucosyllacto-N-Hexaose-a | mg/L | WITH SIBLINGS | V1 | 48 | 148.346054 | 81.70434542 | 125.6285912 | 94.72884661 |
| Difucosyllacto-N-Hexaose-a | mg/L | WITH SIBLINGS | V2 | 54 | 261.9050265 | 169.8874876 | 231.2689262 | 167.1776416 |
| Difucosyllacto-N-Hexaose-a | mg/L | WITH SIBLINGS | V3 | 51 | 206.2678072 | 144.2391624 | 170.0672888 | 110.5643357 |
| Difucosyllacto-N-Hexaose-a | mg/L | WITH SIBLINGS | V4 | 42 | 120.121861 | 100.4379777 | 102.9007162 | 56.84164741 |
| Difucosyllacto-N-Hexaose-a | mg/L | WITH SIBLINGS | V5 | 29 | 97.3857747 | 77.50806012 | 71.724665 | 59.86775755 |
| Difucosyllacto-N-Hexaose-a | mg/L | WITH SIBLINGS | V6 | 24 | 76.45717107 | 53.3864606 | 65.56011998 | 42.44962707 |

| param | unit | DELITYP | visit | q3.75% | min | max |
|---|---|---|---|---|---|---|
| Difucosyllacto-N-Hexaose-a | mg/L | UNIQUE | V1 | 208.71468 | 37.68514348 | 576.8930576 |
| Difucosyllacto-N-Hexaose-a | mg/L | UNIQUE | V2 | 355.9677629 | 33.08461539 | 856.5390082 |
| Difucosyllacto-N-Hexaose-a | mg/L | UNIQUE | V3 | 300.7426145 | 39.43414695 | 807.2575598 |
| Difucosyllacto-N-Hexaose-a | mg/L | UNIQUE | V4 | 149.7452022 | 33.55783812 | 538.5644379 |
| Difucosyllacto-N-Hexaose-a | mg/L | UNIQUE | V5 | 107.3617675 | 33.27717717 | 515.2208712 |
| Difucosyllacto-N-Hexaose-a | mg/L | UNIQUE | V6 | 82.61864327 | 33.45887998 | 270.1883637 |
| Difucosyllacto-N-Hexaose-a | mg/L | WITH SIBLINGS | V1 | 188.3725375 | 33.04833329 | 412.2467197 |
| Difucosyllacto-N-Hexaose-a | mg/L | WITH SIBLINGS | V2 | 307.2992152 | 41.111123 | 1086.897955 |
| Difucosyllacto-N-Hexaose-a | mg/L | WITH SIBLINGS | V3 | 253.965274 | 42.14158522 | 747.7649157 |
| Difucosyllacto-N-Hexaose-a | mg/L | WITH SIBLINGS | V4 | 127.1671806 | 34.70128067 | 606.8605662 |
| Difucosyllacto-N-Hexaose-a | mg/L | WITH SIBLINGS | V5 | 89.40771747 | 33.00609983 | 393.74294 |
| Difucosyllacto-N-Hexaose-a | mg/L | WITH SIBLINGS | V6 | 80.98116787 | 33.43153153 | 266.5264593 |

TABLE X

| param | unit | DELITYP | visit | N | Mean | sd | median |
|---|---|---|---|---|---|---|---|
| Lacto-N-Difucosylhexaose | mg/L | UNIQUE | V1 | 126 | 1234.406373 | 535.3466 | 1180.198793 |
| Lacto-N-Difucosylhexaose | mg/L | UNIQUE | V2 | 158 | 1255.755653 | 537.4429 | 1192.294603 |
| Lacto-N-Difucosylhexaose | mg/L | UNIQUE | V3 | 136 | 1091.823028 | 465.8642 | 995.3117755 |
| Lacto-N-Difucosylhexaose | mg/L | UNIQUE | V4 | 121 | 848.0091077 | 328.5295 | 802.3504693 |
| Lacto-N-Difucosylhexaose | mg/L | UNIQUE | V5 | 116 | 710.6302809 | 271.9261 | 681.6194012 |
| Lacto-N-Difucosylhexaose | mg/L | UNIQUE | V6 | 112 | 634.9542185 | 242.0775 | 624.6350378 |
| Lacto-N-Difucosylhexaose | mg/L | WITH SIBLINGS | V1 | 46 | 1225.800254 | 477.4247 | 1169.458449 |
| Lacto-N-Difucosylhexaose | mg/L | WITH SIBLINGS | V2 | 51 | 1336.18374 | 578.9028 | 1348.485217 |
| Lacto-N-Difucosylhexaose | mg/L | WITH SIBLINGS | V3 | 48 | 1142.006226 | 411.3581 | 1114.291686 |

TABLE X-continued

| | | | | | | | |
|---|---|---|---|---|---|---|---|
| Lacto-N-Difucosylhexaose | mg/L | WITH SIBLINGS | V4 | 48 | 825.7560502 | 324.6839 | 788.8361782 |
| Lacto-N-Difucosylhexaose | mg/L | WITH SIBLINGS | V5 | 45 | 739.1373379 | 317.1183 | 701.7743271 |
| Lacto-N-Difucosylhexaose | mg/L | WITH SIBLINGS | V6 | 44 | 578.2746578 | 236.0452 | 567.1716751 |

| param | q1.25% | q3.75% | min | max |
|---|---|---|---|---|
| Lacto-N-Difucosylhexaose | 849.3209761 | 1495.918413 | 11.58325101 | 3346.954498 |
| Lacto-N-Difucosylhexaose | 942.9128926 | 1550.664139 | 21.63261134 | 3582.842867 |
| Lacto-N-Difucosylhexaose | 821.2656843 | 1344.286596 | 10.97928599 | 3501.352786 |
| Lacto-N-Difucosylhexaose | 662.7755195 | 1023.609883 | 11.88700135 | 1649.120744 |
| Lacto-N-Difucosylhexaose | 541.1164043 | 837.2962088 | 103.063301 | 1722.213919 |
| Lacto-N-Difucosylhexaose | 471.4977544 | 756.5617445 | 111.6094256 | 1485.00214 |
| Lacto-N-Difucosylhexaose | 878.4507667 | 1407.01817 | 462.8830063 | 2782.944079 |
| Lacto-N-Difucosylhexaose | 1108.263831 | 1576.688066 | 12.29676207 | 3031.332599 |
| Lacto-N-Difucosylhexaose | 884.4304615 | 1431.628644 | 169.4986155 | 1927.975206 |
| Lacto-N-Difucosylhexaose | 631.0881501 | 1035.617596 | 74.64280102 | 1917.735932 |
| Lacto-N-Difucosylhexaose | 536.5070919 | 882.8586901 | 221.5440208 | 1793.170075 |
| Lacto-N-Difucosylhexaose | 413.7894666 | 739.2552491 | 60.80285161 | 1261.115824 |

TABLE XI

| param | unit | DELITYP | visit | N | Mean | sd | median |
|---|---|---|---|---|---|---|---|
| Lacto-N-Fucosylpentaose-I | mg/L | UNIQUE | V1 | 139 | 1953.405264 | 895.9388 | 1913.01447 |
| Lacto-N-Fucosylpentaose-I | mg/L | UNIQUE | V2 | 170 | 1442.925271 | 803.4876 | 1369.9995 |
| Lacto-N-Fucosylpentaose-I | mg/L | UNIQUE | V3 | 149 | 1080.473899 | 640.1305 | 933.32871 |
| Lacto-N-Fucosylpentaose-I | mg/L | UNIQUE | V4 | 133 | 610.916764 | 413.7517 | 503.48892 |
| Lacto-N-Fucosylpentaose-I | mg/L | UNIQUE | V5 | 127 | 470.6971887 | 378.858 | 376.267 |
| Lacto-N-Fucosylpentaose-I | mg/L | UNIQUE | V6 | 120 | 388.8400843 | 320.5121 | 315.61007 |
| Lacto-N-Fucosylpentaose-I | mg/L | WITH SIBLINGS | V1 | 48 | 1855.27654 | 929.5294 | 1704.10064 |
| Lacto-N-Fucosylpentaose-I | mg/L | WITH SIBLINGS | V2 | 54 | 1391.449066 | 788.47 | 1172.082955 |
| Lacto-N-Fucosylpentaose-I | mg/L | WITH SIBLINGS | V3 | 52 | 1044.350567 | 593.307 | 1006.408885 |
| Lacto-N-Fucosylpentaose-I | mg/L | WITH SIBLINGS | V4 | 50 | 611.3230378 | 451.9114 | 562.65468 |
| Lacto-N-Fucosylpentaose-I | mg/L | WITH SIBLINGS | V5 | 48 | 465.4264017 | 359.7624 | 380.606735 |
| Lacto-N-Fucosylpentaose-I | mg/L | WITH SIBLINGS | V6 | 45 | 370.5976704 | 304.8824 | 293.10456 |

| param | q1.25% | q3.75% | min | max |
|---|---|---|---|---|
| Lacto-N-Fucosylpentaose-I | 1330.993545 | 2520.18355 | 27.4573 | 4040.89442 |
| Lacto-N-Fucosylpentaose-I | 781.2125 | 2003.57863 | 49.806 | 3756.06871 |
| Lacto-N-Fucosylpentaose-I | 573.47716 | 1496.567 | 28.866 | 3306.848 |
| Lacto-N-Fucosylpentaose-I | 283.029 | 832.54689 | 30.669 | 1970.645 |
| Lacto-N-Fucosylpentaose-I | 185.98 | 617.2625 | 30.394 | 2062.94583 |

TABLE XI-continued

| | | | | |
|---|---|---|---|---|
| Lacto-N-Fucosylpentaose-I | 161.52072 | 501.8237575 | 27.51296 | 1913.34495 |
| Lacto-N-Fucosylpentaose-I | 1202.36626 | 2417.197 | 304.92323 | 4311.24617 |
| Lacto-N-Fucosylpentaose-I | 808.9399325 | 1909.67225 | 106.64425 | 3571.06665 |
| Lacto-N-Fucosylpentaose-I | 594.47375 | 1446.30243 | 77.48494 | 2372.66273 |
| Lacto-N-Fucosylpentaose-I | 285.0165 | 781.02097 | 36.497 | 2068.53637 |
| Lacto-N-Fucosylpentaose-I | 194.196455 | 608.467225 | 28.33995 | 1643.26 |
| Lacto-N-Fucosylpentaose-I | 153.08 | 490.82 | 43.879 | 1622.958 |

15

TABLE XII

| param | unit | DELITYP | visit | N | mean | sd | median |
|---|---|---|---|---|---|---|---|
| Lacto-N-Fucosylpentaose-II | mg/L | UNIQUE | V1 | 145 | 400.7219326 | 518.1076 | 192.6370398 |
| Lacto-N-Fucosylpentaose-II | mg/L | UNIQUE | V2 | 190 | 544.0406658 | 590.6689 | 327.9102556 |
| Lacto-N-Fucosylpentaose-II | mg/L | UNIQUE | V3 | 165 | 512.6256601 | 521.4556 | 320.0085042 |
| Lacto-N-Fucosylpentaose-II | mg/L | UNIQUE | V4 | 149 | 461.1191582 | 396.6782 | 331.221059 |
| Lacto-N-Fucosylpentaose-II | mg/L | UNIQUE | V5 | 146 | 420.9635001 | 326.0906 | 332.4659875 |
| Lacto-N-Fucosylpentaose-II | mg/L | UNIQUE | V6 | 138 | 383.5239207 | 276.9464 | 293.9566112 |
| Lacto-N-Fucosylpentaose-II | mg/L | WITH SIBLINGS | V1 | 57 | 474.9349989 | 519.0685 | 248.5627023 |
| Lacto-N-Fucosylpentaose-II | mg/L | WITH SIBLINGS | V2 | 70 | 732.4415102 | 712.1251 | 428.9741842 |
| Lacto-N-Fucosylpentaose-II | mg/L | WITH SIBLINGS | V3 | 65 | 642.6995951 | 550.2848 | 458.7201961 |
| Lacto-N-Fucosylpentaose-II | mg/L | WITH SIBLINGS | V4 | 64 | 504.6233294 | 416.96 | 327.235739 |
| Lacto-N-Fucosylpentaose-II | mg/L | WITH SIBLINGS | V5 | 63 | 461.6140679 | 346.8066 | 347.3093904 |
| Lacto-N-Fucosylpentaose-II | mg/L | WITH SIBLINGS | V6 | 61 | 416.7272357 | 300.1685 | 326.0899963 |

| param | q1.25% | q3.75% | min | max |
|---|---|---|---|---|
| Lacto-N-Fucosylpentaose-II | 103.6228597 | 323.2837721 | 37.04755787 | 2426.895823 |
| Lacto-N-Fucosylpentaose-II | 182.5788937 | 568.883943 | 52.61106978 | 2856.419409 |
| Lacto-N-Fucosylpentaose-II | 184.3943767 | 543.5270238 | 53.24693544 | 2488.674427 |
| Lacto-N-Fucosylpentaose-II | 216.7351314 | 562.6200229 | 60.89431943 | 2274.458362 |
| Lacto-N-Fucosylpentaose-II | 200.0765447 | 498.1834633 | 53.63244898 | 1714.785797 |
| Lacto-N-Fucosylpentaose-II | 215.2587313 | 449.8741781 | 50.47498562 | 1554.445901 |
| Lacto-N-Fucosylpentaose-II | 124.7083137 | 752.9452298 | 38.05551582 | 2146.380077 |
| Lacto-N-Fucosylpentaose-II | 256.8757435 | 1123.163255 | 35.31341987 | 3602.345161 |
| Lacto-N-Fucosylpentaose-II | 240.4601421 | 955.8715703 | 88.28875496 | 2623.432553 |
| Lacto-N-Fucosylpentaose-II | 217.4510082 | 639.6884927 | 35.93501895 | 2091.202327 |
| Lacto-N-Fucosylpentaose-II | 231.9723537 | 592.70929 | 41.55891583 | 1551.01748 |
| Lacto-N-Fucosylpentaose-II | 214.4554786 | 547.9185395 | 44.29386143 | 1488.541991 |

TABLE XIII

| Visit | Estimate | SE | pvalue | |
|-------|----------|-----|--------|---|
| V1 | 1.276220 | 1.132216 | 0.04972522 | |
| V2 | 1.350333 | 1.130009 | 0.01412686 | 5 |
| V3 | 1.337439 | 1.131037 | 0.01835975 | |
| V4 | 1.211846 | 1.131458 | 0.12001568 | |
| V5 | 1.191473 | 1.131706 | 0.15703207 | |
| V6 | 1.147623 | 1.132101 | 0.26730874 | |

TABLE XIV

| param | unit | DELITYP | visit | N | mean | sd | median |
|-------|------|---------|-------|-----|------|-----|--------|
| Lacto-N-Fucosylpentaose-III | mg/L | UNIQUE | V1 | 172 | 440.7436567 | 162.9639 | 425.9454976 |
| Lacto-N-Fucosylpentaose-III | mg/L | UNIQUE | V2 | 214 | 324.5042397 | 155.5033 | 307.6437027 |
| Lacto-N-Fucosylpentaose-III | mg/L | UNIQUE | V3 | 189 | 313.7021468 | 104.9384 | 304.1777874 |
| Lacto-N-Fucosylpentaose-III | mg/L | UNIQUE | V4 | 173 | 361.8867399 | 117.8097 | 352.9061564 |
| Lacto-N-Fucosylpentaose-III | mg/L | UNIQUE | V5 | 166 | 355.1420518 | 92.17895 | 351.5526117 |
| Lacto-N-Fucosylpentaose-III | mg/L | UNIQUE | V6 | 158 | 345.2252395 | 93.83141 | 337.6224468 |
| Lacto-N-Fucosylpentaose-III | mg/L | WITH SIBLINGS | V1 | 64 | 454.7211229 | 173.722 | 441.4279491 |
| Lacto-N-Fucosylpentaose-III | mg/L | WITH SIBLINGS | V2 | 75 | 307.1033885 | 86.78954 | 304.261907 |
| Lacto-N-Fucosylpentaose-III | mg/L | WITH SIBLINGS | V3 | 71 | 303.1843203 | 78.66454 | 293 |
| Lacto-N-Fucosylpentaose-III | mg/L | WITH SIBLINGS | V4 | 69 | 348.8290902 | 89.00072 | 335.6039586 |
| Lacto-N-Fucosylpentaose-III | mg/L | WITH SIBLINGS | V5 | 67 | 349.2434082 | 93.08592 | 345.6968971 |
| Lacto-N-Fucosylpentaose-III | mg/L | WITH SIBLINGS | V6 | 65 | 323.8386581 | 87.5295 | 313.2473169 |

| param | q1.25% | q3.75% | min | max |
|-------|--------|--------|-----|-----|
| Lacto-N-Fucosylpentaose-III | 326.9628144 | 523.1014552 | 117.4373288 | 1151.993123 |
| Lacto-N-Fucosylpentaose-III | 231.1082286 | 388.025127 | 79.94840168 | 1751.020203 |
| Lacto-N-Fucosylpentaose-III | 252.945844 | 378.3723403 | 97.1179054 | 951.8773833 |
| Lacto-N-Fucosylpentaose-III | 289.4064649 | 414.3069494 | 80.61587114 | 1196.494936 |
| Lacto-N-Fucosylpentaose-III | 281.5673515 | 416.9454623 | 166.2976602 | 635.2849534 |
| Lacto-N-Fucosylpentaose-III | 284.583471 | 413.5865187 | 138.1858699 | 557.1545027 |
| Lacto-N-Fucosylpentaose-III | 315.3262438 | 541.2156412 | 187.9371289 | 890.3129598 |
| Lacto-N-Fucosylpentaose-III | 246.1138864 | 356.6258239 | 87.25376406 | 535.9760196 |
| Lacto-N-Fucosylpentaose-III | 257.845359 | 348.19862 | 147.4060444 | 563.392227 |
| Lacto-N-Fucosylpentaose-III | 292.1571655 | 405.4241552 | 160.7903865 | 543.5231017 |
| Lacto-N-Fucosylpentaose-III | 278.5226687 | 399.4384528 | 126.2259899 | 679.9790614 |
| Lacto-N-Fucosylpentaose-III | 251.2469262 | 383.3281509 | 134.2613528 | 567.5952348 |

TABLE XV

| param | unit | DELITYP | visit | N | mean | sd | median |
|-------|------|---------|-------|-----|------|-----|--------|
| Lacto-N-Fucosylpentaose-V | mg/L | UNIQUE | V1 | 112 | 109.4842732 | 107.2949 | 48.9985 |
| Lacto-N-Fucosylpentaose-V | mg/L | UNIQUE | V2 | 175 | 119.017012 | 114.1155 | 63.592 |

TABLE XV-continued

| | | | | | | | |
|---|---|---|---|---|---|---|---|
| Lacto-N-Fucosylpentaose-V | mg/L | UNIQUE | V3 | 155 | 109.9870335 | 101.3161 | 61.36453 |
| Lacto-N-Fucosylpentaose-V | mg/L | UNIQUE | V4 | 144 | 90.07381556 | 72.94248 | 58.491385 |
| Lacto-N-Fucosylpentaose-V | mg/L | UNIQUE | V5 | 135 | 87.41945786 | 70.56107 | 57.784 |
| Lacto-N-Fucosylpentaose-V | mg/L | UNIQUE | V6 | 129 | 76.81346488 | 59.9275 | 54.037 |
| Lacto-N-Fucosylpentaose-V | mg/L | WITH SIBLINGS | V1 | 46 | 105.4405772 | 91.79857 | 57.939865 |
| Lacto-N-Fucosylpentaose-V | mg/L | WITH SIBLINGS | V2 | 68 | 138.2168362 | 125.1875 | 84.83034 |
| Lacto-N-Fucosylpentaose-V | mg/L | WITH SIBLINGS | V3 | 65 | 116.1223805 | 95.20984 | 75.977 |
| Lacto-N-Fucosylpentaose-V | mg/L | WITH SIBLINGS | V4 | 62 | 91.59901602 | 71.28318 | 64.315775 |
| Lacto-N-Fucosylpentaose-V | mg/L | WITH SIBLINGS | V5 | 60 | 79.1156255 | 55.1115 | 59.570785 |
| Lacto-N-Fucosylpentaose-V | mg/L | WITH SIBLINGS | V6 | 57 | 73.00692544 | 49.32591 | 53.91017 |

| param | q1.25% | q3.75% | min | max |
|---|---|---|---|---|
| Lacto-N-Fucosylpentaose-V | 34.0883725 | 176.98825 | 24.098 | 393.23939 |
| Lacto-N-Fucosylpentaose-V | 42.54693 | 172.5235 | 24.15465 | 495.7132 |
| Lacto-N-Fucosylpentaose-V | 44.732165 | 132.402505 | 24.357 | 427.275 |
| Lacto-N-Fucosylpentaose-V | 41.540815 | 120.62295 | 24.31422 | 412.37003 |
| Lacto-N-Fucosylpentaose-V | 42.07251 | 105.3295 | 25.775 | 360.11687 |
| Lacto-N-Fucosylpentaose-V | 39.65592 | 91.13553 | 24.172 | 325 |
| Lacto-N-Fucosylpentaose-V | 36.8393575 | 165.8721925 | 24.184 | 309.94073 |
| Lacto-N-Fucosylpentaose-V | 49.35551 | 224.66925 | 25.57568 | 515.4305 |
| Lacto-N-Fucosylpentaose-V | 50.50503 | 148.75439 | 24.72194 | 414.4 |
| Lacto-N-Fucosylpentaose-V | 41.231875 | 111.3105 | 24.48 | 360.47113 |
| Lacto-N-Fucosylpentaose-V | 38.57574 | 101.87361 | 26.214 | 243.549 |
| Lacto-N-Fucosylpentaose-V | 38.03945 | 97.496 | 24.586 | 232.777 |

TABLE XVI

| param | unit | DELITYP | visit | N | Mean | Sd | median |
|---|---|---|---|---|---|---|---|
| Lacto-N-hexaose (A) | mg/L | UNIQUE | V1 | 139 | 69.65726947 | 60.09699 | 58.2952622 |
| Lacto-N-hexaose (A) | mg/L | UNIQUE | V2 | 205 | 83.91299646 | 44.09424 | 72.90325819 |
| Lacto-N-hexaose (A) | mg/L | UNIQUE | V3 | 185 | 71.67837167 | 65.1411 | 60.20319698 |
| Lacto-N-hexaose (A) | mg/L | UNIQUE | V4 | 154 | 39.62268882 | 18.54261 | 34.7920641 |
| Lacto-N-hexaose (A) | mg/L | UNIQUE | V5 | 130 | 30.26720457 | 14.06454 | 25.06469316 |
| Lacto-N-hexaose (A) | mg/L | UNIQUE | V6 | 107 | 25.29538373 | 9.751377 | 21.98491257 |
| Lacto-N-hexaose (A) | mg/L | WITH SIBLINGS | V1 | 53 | 69.44083736 | 43.31972 | 62.07164331 |
| Lacto-N-hexaose (A) | mg/L | WITH SIBLINGS | V2 | 74 | 69.18762737 | 31.78699 | 60.56720348 |
| Lacto-N-hexaose (A) | mg/L | WITH SIBLINGS | V3 | 70 | 62.49890449 | 31.54116 | 53.23506574 |
| Lacto-N-hexaose (A) | mg/L | WITH SIBLINGS | V4 | 63 | 38.80460416 | 20.67884 | 34.70663487 |
| Lacto-N-hexaose (A) | mg/L | WITH SIBLINGS | V5 | 52 | 33.10356562 | 20.12426 | 27.47100266 |
| Lacto-N-hexaose (A) | mg/L | WITH SIBLINGS | V6 | 51 | 27.65797971 | 11.52966 | 24.0510901 |

TABLE XVI-continued

| param | q1.25% | q3.75% | min | max |
|---|---|---|---|---|
| Lacto-N-hexaose (A) | 38.17826996 | 81.61276425 | 18.36222878 | 585.5330588 |
| Lacto-N-hexaose (A) | 54.70601626 | 109.8055481 | 17.46965778 | 255.4484418 |
| Lacto-N-hexaose (A) | 43.02753693 | 84.88738297 | 16.19895295 | 803.0893219 |
| Lacto-N-hexaose (A) | 27.13590373 | 46.62997118 | 16.3928703 | 112.8544379 |
| Lacto-N-hexaose (A) | 20.88531751 | 32.23440104 | 16.0313543 | 87.57130429 |
| Lacto-N-hexaose (A) | 19.09685889 | 27.93809463 | 16.1076984 | 68.12521273 |
| Lacto-N-hexaose (A) | 46.00691942 | 81.83799145 | 16.96457388 | 248.8007182 |
| Lacto-N-hexaose (A) | 45.91588703 | 82.53308105 | 18.15175655 | 169.5397907 |
| Lacto-N-hexaose (A) | 41.84623544 | 77.85927254 | 17.24348703 | 202.4682182 |
| Lacto-N-hexaose (A) | 26.44253846 | 44.29626051 | 17.87155202 | 139.2964627 |
| Lacto-N-hexaose (A) | 22.26315853 | 38.02796933 | 16.26681559 | 141.4095103 |
| Lacto-N-hexaose (A) | 20.30278179 | 31.43146137 | 16.26239728 | 69.64415593 |

TABLE XVII

| param | unit | DELITYP | Visit | N | mean | Sd | median |
|---|---|---|---|---|---|---|---|
| Lacto-N-hexaose (B) | mg/L | UNIQUE | V1 | 134 | 44.73295024 | 34.32684 | 33.28233637 |
| Lacto-N-hexaose (B) | mg/L | UNIQUE | V2 | 145 | 43.11011358 | 23.31967 | 35.13295515 |
| Lacto-N-hexaose (B) | mg/L | UNIQUE | V3 | 133 | 38.50327162 | 21.12716 | 32.35290783 |
| Lacto-N-hexaose (B) | mg/L | UNIQUE | V4 | 91 | 33.26540708 | 18.18317 | 26.42650386 |
| Lacto-N-hexaose (B) | mg/L | UNIQUE | V5 | 59 | 31.002883 | 17.26554 | 24.99800181 |
| Lacto-N-hexaose (B) | mg/L | UNIQUE | V6 | 43 | 27.72187917 | 15.68486 | 22.97054189 |
| Lacto-N-hexaose (B) | mg/L | WITH SIBLINGS | V1 | 40 | 41.5669005 | 25.93896 | 37.79728256 |
| Lacto-N-hexaose (B) | mg/L | WITH SIBLINGS | V2 | 36 | 36.02515556 | 16.13595 | 30.58969053 |
| Lacto-N-hexaose (B) | mg/L | WITH SIBLINGS | V3 | 43 | 34.28955775 | 15.68827 | 29.61018115 |
| Lacto-N-hexaose (B) | mg/L | WITH SIBLINGS | V4 | 29 | 34.74970859 | 13.55697 | 31.13853753 |
| Lacto-N-hexaose (B) | mg/L | WITH SIBLINGS | V5 | 22 | 28.51987306 | 13.09366 | 24.76177376 |
| Lacto-N-hexaose (B) | mg/L | WITH SIBLINGS | V6 | 18 | 28.88319141 | 11.91772 | 27.2941175 |

| param | q1.25% | q3.75% | min | max |
|---|---|---|---|---|
| Lacto-N-hexaose (B) | 22.79344461 | 53.48647374 | 16.03905983 | 220.7927384 |
| Lacto-N-hexaose (B) | 27.90776152 | 55.01012587 | 16.31270557 | 179.8286126 |
| Lacto-N-hexaose (B) | 24.09883189 | 45.67418316 | 16.18714448 | 131.3072962 |
| Lacto-N-hexaose (B) | 19.69922881 | 39.64344687 | 16.41060296 | 115.2056418 |
| Lacto-N-hexaose (B) | 20.04178856 | 33.98491795 | 16.25904523 | 105.2379451 |
| Lacto-N-hexaose (B) | 18.6143141 | 32.997549 | 16.02806725 | 99.84562336 |
| Lacto-N-hexaose (B) | 24.8190705 | 44.77882074 | 16.60528968 | 135.9994959 |
| Lacto-N-hexaose (B) | 23.74009313 | 46.45568574 | 17.15234171 | 84.77670516 |

TABLE XVII-continued

| | | | | |
|---|---|---|---|---|
| Lacto-N-hexaose (B) | 23.11258219 | 45.36245075 | 16.5380127 | 85.67908288 |
| Lacto-N-hexaose (B) | 24.25250318 | 43.6851328 | 16.78734358 | 76.04017383 |
| Lacto-N-hexaose (B) | 18.2128352 | 33.18017398 | 16.04481676 | 63.3735739 |
| Lacto-N-hexaose (B) | 20.37699792 | 31.56511312 | 16.83515397 | 62.67504542 |

TABLE XVIII

| param | unit | DELITYP | Visit | N | mean | sd | median |
|---|---|---|---|---|---|---|---|
| Lacto-N-Neodifucosylhexaose | mg/L | UNIQUE | V1 | 117 | 111.9565166 | 69.43106 | 94.19356953 |
| Lacto-N-Neodifucosylhexaose | mg/L | UNIQUE | V2 | 69 | 63.29788709 | 74.07394 | 43.4578365 |
| Lacto-N-Neodifucosylhexaose | mg/L | UNIQUE | V3 | 43 | 57.46798821 | 56.84744 | 46.51065959 |
| Lacto-N-Neodifucosylhexaose | mg/L | UNIQUE | V4 | 56 | 55.60053979 | 33.48608 | 41.85130914 |
| Lacto-N-Neodifucosylhexaose | mg/L | UNIQUE | V5 | 38 | 54.58027932 | 27.91287 | 45.11014515 |
| Lacto-N-Neodifucosylhexaose | mg/L | UNIQUE | V6 | 29 | 64.33423068 | 33.2452 | 56.79116124 |
| Lacto-N-Neodifucosylhexaose | mg/L | WITH SIBLINGS | V1 | 46 | 114.8602548 | 82.49724 | 80.63002523 |
| Lacto-N-Neodifucosylhexaose | mg/L | WITH SIBLINGS | V2 | 19 | 61.94019548 | 45.97203 | 45.4381543 |
| Lacto-N-Neodifucosylhexaose | mg/L | WITH SIBLINGS | V3 | 15 | 58.61383439 | 39.13784 | 54.97433839 |
| Lacto-N-Neodifucosylhexaose | mg/L | WITH SIBLINGS | V4 | 19 | 54.94306309 | 22.66628 | 48.37428768 |
| Lacto-N-Neodifucosylhexaose | mg/L | WITH SIBLINGS | V5 | 18 | 63.29320064 | 32.14269 | 53.26006424 |
| Lacto-N-Neodifucosylhexaose | mg/L | WITH SIBLINGS | V6 | 16 | 58.9507447 | 27.15766 | 45.11453324 |

| param | q1.25% | q3.75% | min | max |
|---|---|---|---|---|
| Lacto-N-Neodifucosylhexaose | 59.70978875 | 132.6595225 | 29.32389989 | 334.1268818 |
| Lacto-N-Neodifucosylhexaose | 36.27672844 | 68.9398609 | 28.52752291 | 612.4524307 |
| Lacto-N-Neodifucosylhexaose | 32.51100498 | 65.227353 | 28.13123604 | 398.4920634 |
| Lacto-N-Neodifucosylhexaose | 34.6297264 | 73.17992495 | 28.10296364 | 224.0399443 |
| Lacto-N-Neodifucosylhexaose | 34.29570779 | 63.77490019 | 28.12614506 | 141.5694861 |
| Lacto-N-Neodifucosylhexaose | 35.66139704 | 82.82903182 | 28.64848952 | 151.8818948 |
| Lacto-N-Neodifucosylhexaose | 57.15833441 | 153.8645579 | 31.26569753 | 350.3302321 |
| Lacto-N-Neodifucosylhexaose | 35.75460343 | 68.64819832 | 29.95124997 | 226.4465075 |
| Lacto-N-Neodifucosylhexaose | 34.52825063 | 66.41893776 | 29.35106887 | 187.0453095 |
| Lacto-N-Neodifucosylhexaose | 40.02309424 | 65.92514047 | 28.49364998 | 114.5744313 |
| Lacto-N-Neodifucosylhexaose | 38.88978245 | 79.91072693 | 30.09514734 | 140.8977209 |
| Lacto-N-Neodifucosylhexaose | 39.24229995 | 73.74432573 | 32.02848488 | 111.8547311 |

TABLE XIX

| param | unit | DELITYP | visit | N | mean | sd | median |
|---|---|---|---|---|---|---|---|
| Lacto-N-Neofucosylpentaose | mg/L | UNIQUE | V1 | 50 | 37.2525136 | 16.38068 | 33.67124 |
| Lacto-N-Neofucosylpentaose | mg/L | UNIQUE | V2 | 42 | 29.88595143 | 10.58937 | 26.92816 |
| Lacto-N-Neofucosylpentaose | mg/L | UNIQUE | V3 | 40 | 27.0749745 | 9.243692 | 23.80713 |
| Lacto-N-Neofucosylpentaose | mg/L | UNIQUE | V4 | 39 | 30.60720744 | 12.18325 | 27.47212 |
| Lacto-N-Neofucosylpentaose | mg/L | UNIQUE | V5 | 31 | 27.02506516 | 6.34542 | 25.69 |
| Lacto-N-Neofucosylpentaose | mg/L | UNIQUE | V6 | 23 | 26.7532187 | 7.552031 | 24.091 |
| Lacto-N-Neofucosylpentaose | mg/L | WITH SIBLINGS | V1 | 22 | 35.40536864 | 16.21748 | 28.809265 |
| Lacto-N-Neofucosylpentaose | mg/L | WITH SIBLINGS | V2 | 16 | 23.29734 | 3.547994 | 23.303695 |
| Lacto-N-Neofucosylpentaose | mg/L | WITH SIBLINGS | V3 | 11 | 31.39661 | 8.042168 | 29.12481 |
| Lacto-N-Neofucosylpentaose | mg/L | WITH SIBLINGS | V4 | 12 | 32.5542 | 11.27676 | 32.015775 |
| Lacto-N-Neofucosylpentaose | mg/L | WITH SIBLINGS | V5 | 11 | 28.90526364 | 10.61775 | 25.04186 |
| Lacto-N-Neofucosylpentaose | mg/L | WITH SIBLINGS | V6 | 9 | 30.85879 | 15.08243 | 24.315 |

| param | q1.25% | q3.75% | min | max |
|---|---|---|---|---|
| Lacto-N-Neofucosylpentaose | 24.897 | 41.76092 | 19.73896 | 92.18025 |
| Lacto-N-Neofucosylpentaose | 22.144305 | 30.94125 | 19.066 | 59.578 |
| Lacto-N-Neofucosylpentaose | 21.4349075 | 28.11675 | 19.002 | 53.52264 |
| Lacto-N-Neofucosylpentaose | 23.1454 | 32.614335 | 19.074 | 82.885 |
| Lacto-N-Neofucosylpentaose | 22.51126 | 28.6975 | 19.037 | 42.33404 |
| Lacto-N-Neofucosylpentaose | 20.97355 | 29.805 | 19.054 | 48.112 |
| Lacto-N-Neofucosylpentaose | 26.059 | 39.3506325 | 20.14561 | 84.56933 |
| Lacto-N-Neofucosylpentaose | 20.0572975 | 25.788 | 19.148 | 30.76332 |
| Lacto-N-Neofucosylpentaose | 25.681345 | 36.948515 | 22.29 | 46.081 |
| Lacto-N-Neofucosylpentaose | 23.654625 | 35.353345 | 22.437 | 60.886 |
| Lacto-N-Neofucosylpentaose | 21.985635 | 31.76967 | 20.88696 | 57.46976 |
| Lacto-N-Neofucosylpentaose | 20.677 | 29.41272 | 20.15457 | 64.87128 |

TABLE XX

| param | unit | DELITYP | visit | N | mean | sd | median |
|---|---|---|---|---|---|---|---|
| Lacto-N-Neotetraose | mg/L | UNIQUE | V1 | 173 | 307.7437813 | 131.4372 | 293.564 |
| Lacto-N-Neotetraose | mg/L | UNIQUE | V2 | 213 | 184.6575148 | 100.9842 | 173.50436 |
| Lacto-N-Neotetraose | mg/L | UNIQUE | V3 | 187 | 156.7024487 | 82.56116 | 146.70853 |
| Lacto-N-Neotetraose | mg/L | UNIQUE | V4 | 168 | 128.4345314 | 83.21485 | 107.724735 |
| Lacto-N-Neotetraose | mg/L | UNIQUE | V5 | 158 | 107.643116 | 69.56969 | 91.5955 |
| Lacto-N-Neotetraose | mg/L | UNIQUE | V6 | 146 | 98.41257377 | 60.79302 | 83.588435 |
| Lacto-N-Neotetraose | mg/L | WITH SIBLINGS | V1 | 64 | 304.2184716 | 135.7726 | 298.56318 |
| Lacto-N-Neotetraose | mg/L | WITH SIBLINGS | V2 | 72 | 154.2337461 | 79.88463 | 141.929085 |
| Lacto-N-Neotetraose | mg/L | WITH SIBLINGS | V3 | 68 | 144.1930094 | 71.03133 | 132.30853 |

TABLE XX-continued

| param | unit | DELITYP | visit | N | mean | Sd | median |
|---|---|---|---|---|---|---|---|
| Lacto-N-Neotetraose | mg/L | WITH SIBLINGS | 6 | 44 | 126.1508667 | 72.02305 | 112.7993 |
| Lacto-N-Neotetraose | mg/L | WITH SIBLINGS | 6 | 05 | 107.7504913 | 60.55004 | 93.494 |
| Lacto-N-Neotetraose | mg/L | WITH SIBLINGS | 6 | 26 | 96.30362226 | 64.02489 | 79.572765 |

| param | q1.25% | q3.75% | min | max |
|---|---|---|---|---|
| Lacto-N-Neotetraose | 214.326 | 389.59097 | 47.75439 | 699.27383 |
| Lacto-N-Neotetraose | 102.93676 | 246.335 | 25.73309 | 597.13727 |
| Lacto-N-Neotetraose | 89.75674 | 205.208 | 26.64085 | 424.58858 |
| Lacto-N-Neotetraose | 69.01625 | 167.72524 | 25.0473 | 463.904 |
| Lacto-N-Neotetraose | 58.5215 | 136.18827 | 25.20536 | 398.9075 |
| Lacto-N-Neotetraose | 52.0978825 | 121.5750225 | 25.22179 | 298.346 |
| Lacto-N-Neotetraose | 219.730275 | 373.411605 | 64.40836 | 695.668 |
| Lacto-N-Neotetraose | 96.1692475 | 202.7789125 | 32.626 | 407.85 |
| Lacto-N-Neotetraose | 85.0371325 | 200.53189 | 31.748 | 333.83 |
| Lacto-N-Neotetraose | 63.8390525 | 179.90584 | 25.575 | 309.45348 |
| Lacto-N-Neotetraose | 62.7070925 | 147.2496125 | 31.655 | 257.58145 |
| Lacto-N-Neotetraose | 47.7260275 | 118.86836 | 24.222 | 277.71054 |

TABLE XXI

| param | unit | DELITYP | visit | N | mean | Sd | median |
|---|---|---|---|---|---|---|---|
| Lacto-N-Tetraose | mg/L | UNIQUE | V1 | 173 | 941.3105777 | 869.2799 | 668.05 |
| Lacto-N-Tetraose | mg/L | UNIQUE | V2 | 215 | 1198.301294 | 760.0552 | 1066.41302 |
| Lacto-N-Tetraose | mg/L | UNIQUE | V3 | 190 | 1013.002805 | 642.5475 | 860.403755 |
| Lacto-N-Tetraose | mg/L | UNIQUE | V4 | 174 | 710.5043052 | 451.1813 | 624.944005 |
| Lacto-N-Tetraose | mg/L | UNIQUE | V5 | 167 | 617.336245 | 439.7945 | 499.74 |
| Lacto-N-Tetraose | mg/L | UNIQUE | V6 | 159 | 541.9378956 | 396.6598 | 460.991 |
| Lacto-N-Tetraose | mg/L | WITH SIBLINGS | V1 | 64 | 833.6287748 | 579.2782 | 791.530885 |
| Lacto-N-Tetraose | mg/L | WITH SIBLINGS | V2 | 75 | 1255.222192 | 591.7982 | 1121.872 |
| Lacto-N-Tetraose | mg/L | WITH SIBLINGS | V3 | 71 | 1000.002187 | 425.3526 | 947.02993 |
| Lacto-N-Tetraose | mg/L | WITH SIBLINGS | V4 | 68 | 672.2036891 | 307.2625 | 647.973965 |
| Lacto-N-Tetraose | mg/L | WITH SIBLINGS | V5 | 67 | 552.031873 | 275.787 | 479.85205 |
| Lacto-N-Tetraose | mg/L | WITH SIBLINGS | V6 | 63 | 486.68108 | 230.7009 | 413.22725 |

| param | q1.25% | q3.75% | min | max |
|---|---|---|---|---|
| Lacto-N-Tetraose | 389.089 | 1247.059 | 21.9529 | 6714.31284 |
| Lacto-N-Tetraose | 672.8633 | 1443.05473 | 125.055 | 5360.81507 |
| Lacto-N-Tetraose | 608.09198 | 1259.128325 | 119.024 | 4011.92765 |
| Lacto-N-Tetraose | 429.9219475 | 815.3775375 | 121.34189 | 2894.36631 |
| Lacto-N-Tetraose | 349.65877 | 738.019535 | 85.62092 | 2932.955 |
| Lacto-N-Tetraose | 300.9595 | 640.624545 | 101.62557 | 3026.125 |
| Lacto-N-Tetraose | 402.6631225 | 1063.8035 | 53.0063 | 2461.67215 |
| Lacto-N-Tetraose | 840.66133 | 1577.087795 | 161.241 | 3144.60141 |
| Lacto-N-Tetraose | 687.912885 | 1289.76172 | 147.76 | 2176.884 |
| Lacto-N-Tetraose | 424.3854625 | 893.4178375 | 125.368 | 1648.35178 |
| Lacto-N-Tetraose | 348.85265 | 767.16389 | 105.469 | 1182.654 |
| Lacto-N-Tetraose | 290.58641 | 641.668435 | 90.424 | 971.2455 |

TABLE XXII

| param | unit | DELITYP | visit | N | mean | sd | median |
|---|---|---|---|---|---|---|---|
| Lactodifucosyllactose | mg/L | UNIQUE | V1 | 138 | 602.4483369 | 532.6734 | 420.450595 |
| Lactodifucosyllactose | mg/L | UNIQUE | V2 | 168 | 356.5481879 | 418.4975 | 226.1571229 |
| Lactodifucosyllactose | mg/L | UNIQUE | V3 | 146 | 276.3310824 | 241.1256 | 225.6436741 |
| Lactodifucosyllactose | mg/L | UNIQUE | V4 | 132 | 276.9074259 | 155.7537 | 235.3399016 |
| Lactodifucosyllactose | mg/L | UNIQUE | V5 | 127 | 262.4787906 | 105.0967 | 251.3244514 |
| Lactodifucosyllactose | mg/L | UNIQUE | V6 | 122 | 271.2121321 | 118.9087 | 251.5873565 |
| Lactodifucosyllactose | mg/L | WITH SIBLINGS | V1 | 48 | 621.9134647 | 632.5672 | 446.7314741 |
| Lactodifucosyllactose | mg/L | WITH SIBLINGS | V2 | 53 | 324.4667808 | 207.8789 | 263.9484063 |
| Lactodifucosyllactose | mg/L | WITH SIBLINGS | V3 | 52 | 278.3663381 | 202.4931 | 229.1361688 |
| Lactodifucosyllactose | mg/L | WITH SIBLINGS | V4 | 50 | 288.8035427 | 153.0885 | 253.9644236 |
| Lactodifucosyllactose | mg/L | WITH SIBLINGS | V5 | 48 | 301.0084875 | 180.131 | 270.6795168 |
| Lactodifucosyllactose | mg/L | WITH SIBLINGS | V6 | 46 | 264.2267501 | 143.745 | 235.4535289 |

| param | q1.25% | q3.75% | min | max |
|---|---|---|---|---|
| Lactodifucosyllactose | 252.9317593 | 740.5602398 | 79.7125399 | 2988.924526 |
| Lactodifucosyllactose | 150.8612583 | 382.6521639 | 45.93249331 | 2996.415918 |
| Lactodifucosyllactose | 153.9841793 | 302.7349125 | 54.62821152 | 1682.713383 |
| Lactodifucosyllactose | 189.679307 | 314.4043267 | 47.58249391 | 1108.712256 |
| Lactodifucosyllactose | 194.6646696 | 328.8925958 | 54.61609346 | 659.1978832 |
| Lactodifucosyllactose | 197.9919531 | 321.6287901 | 51.57284974 | 738.7201617 |
| Lactodifucosyllactose | 226.8209576 | 724.3811897 | 50.73247046 | 3297.275118 |
| Lactodifucosyllactose | 179.9819135 | 365.4112845 | 85.89288249 | 1006.992878 |
| Lactodifucosyllactose | 148.2192763 | 307.5226659 | 49.85838655 | 1155.744731 |
| Lactodifucosyllactose | 185.9829117 | 369.4069428 | 48.51975875 | 755.2157228 |
| Lactodifucosyllactose | 159.9668191 | 374.1570922 | 46.25256273 | 823.6766534 |
| Lactodifucosyllactose | 166.4023321 | 323.0766056 | 51.0670661 | 789.5430687 |

TABLE XXIII

| param | unit | DELITYP | visit | N | mean | Sd | median |
|---|---|---|---|---|---|---|---|
| Sialyllacto-N-Tetraose a | mg/L | UNIQUE | V1 | 173 | 120.4946707 | 143.5211 | 79.38738266 |
| Sialyllacto-N-Tetraose a | mg/L | UNIQUE | V2 | 215 | 120.320383 | 174.7271 | 67.4387729 |
| Sialyllacto-N-Tetraose a | mg/L | UNIQUE | V3 | 190 | 102.3350203 | 162.4454 | 52.40591398 |
| Sialyllacto-N-Tetraose a | mg/L | UNIQUE | V4 | 174 | 93.13419276 | 147.0611 | 43.84859549 |
| Sialyllacto-N-Tetraose a | mg/L | UNIQUE | V5 | 167 | 94.31415999 | 147.0746 | 49.15530418 |
| Sialyllacto-N-Tetraose a | mg/L | UNIQUE | V6 | 159 | 87.10861153 | 104.4478 | 53.16420322 |
| Sialyllacto-N-Tetraose a | mg/L | WITH SIBLINGS | V1 | 64 | 131.8621806 | 146.2816 | 82.78296339 |
| Sialyllacto-N-Tetraose a | mg/L | WITH SIBLINGS | V2 | 75 | 156.1165221 | 252.4851 | 74.99139372 |
| Sialyllacto-N-Tetraose a | mg/L | WITH SIBLINGS | V3 | 71 | 120.6949772 | 178.2896 | 53.99733714 |
| Sialyllacto-N-Tetraose a | mg/L | WITH SIBLINGS | V4 | 69 | 107.0655282 | 131.3995 | 57.34829438 |
| Sialyllacto-N-Tetraose a | mg/L | WITH SIBLINGS | V5 | 67 | 116.0504387 | 134.8519 | 60.29079818 |
| Sialyllacto-N-Tetraose a | mg/L | WITH SIBLINGS | V6 | 65 | 104.5433758 | 111.7794 | 56.80548521 |

| param | q1.25% | q3.75% | min | max |
|---|---|---|---|---|
| Sialyllacto-N-Tetraose a | 47.18897931 | 124.0410768 | 0 | 837.4945131 |
| Sialyllacto-N-Tetraose a | 38.1468268 | 107.9080843 | 0 | 1110.361583 |
| Sialyllacto-N-Tetraose a | 27.44278706 | 92.1621572 | 0 | 1121.248141 |
| Sialyllacto-N-Tetraose a | 23.94542777 | 89.71831532 | 0 | 1187.41635 |

TABLE XXIII-continued

| | | | | |
|---|---|---|---|---|
| Sialyllacto-N-Tetraose a | 26.76896814 | 90.56411096 | 0 | 1133.515897 |
| Sialyllacto-N-Tetraose a | 27.54758109 | 103.3993222 | 0 | 613.7754102 |
| Sialyllacto-N-Tetraose a | 51.7635368 | 141.5571605 | 0 | 744.0657752 |
| Sialyllacto-N-Tetraose a | 47.88950453 | 132.3895992 | 0 | 1819.176794 |
| Sialyllacto-N-Tetraose a | 35.99927184 | 100.647476 | 0 | 1092.717349 |
| Sialyllacto-N-Tetraose a | 33.00046274 | 108.7613672 | 0 | 619.6592317 |
| Sialyllacto-N-Tetraose a | 36.44169544 | 133.7701709 | 0 | 566.2366019 |
| Sialyllacto-N-Tetraose a | 36.89919403 | 147.2063842 | 6.388328416 | 492.4752761 |

TABLE XXIV

| param | unit | DELITYP | visit | N | mean | Sd | median |
|---|---|---|---|---|---|---|---|
| Sialyllacto-N-Tetraose b | mg/L | UNIQUE | V1 | 170 | 79.18246062 | 42.28283 | 68.72569099 |
| Sialyllacto-N-Tetraose b | mg/L | UNIQUE | V2 | 214 | 78.58361782 | 42.06355 | 70.1670586 |
| Sialyllacto-N-Tetraose b | mg/L | UNIQUE | V3 | 189 | 75.84894256 | 38.80082 | 67.84839427 |
| Sialyllacto-N-Tetraose b | mg/L | UNIQUE | V4 | 170 | 64.81255413 | 32.93704 | 58.95748683 |
| Sialyllacto-N-Tetraose b | mg/L | UNIQUE | V5 | 162 | 57.12345702 | 30.98851 | 50.59947014 |
| Sialyllacto-N-Tetraose b | mg/L | UNIQUE | V6 | 155 | 52.23655174 | 29.0665 | 44.63595583 |
| Sialyllacto-N-Tetraose b | mg/L | WITH SIBLINGS | V1 | 64 | 79.88850896 | 33.7112 | 72.77711539 |
| Sialyllacto-N-Tetraose b | mg/L | WITH SIBLINGS | V2 | 75 | 82.99519595 | 33.57784 | 73.74143426 |
| Sialyllacto-N-Tetraose b | mg/L | WITH SIBLINGS | V3 | 71 | 81.41914544 | 34.10483 | 78.12830055 |
| Sialyllacto-N-Tetraose b | mg/L | WITH SIBLINGS | V4 | 67 | 63.55755653 | 31.84949 | 55.58607088 |
| Sialyllacto-N-Tetraose b | mg/L | WITH SIBLINGS | V5 | 66 | 55.35928595 | 31.36357 | 46.55150531 |
| Sialyllacto-N-Tetraose b | mg/L | WITH SIBLINGS | V6 | 63 | 45.79773144 | 24.27547 | 37.24666837 |

| param | q1.25% | q3.75% | min | max |
|---|---|---|---|---|
| Sialyllacto-N-Tetraose b | 53.1564539 | 90.75480198 | 14.91737174 | 275.7441984 |
| Sialyllacto-N-Tetraose b | 48.80673735 | 96.07204811 | 19.62994206 | 323.091464 |
| Sialyllacto-N-Tetraose b | 47.47623501 | 95.76248549 | 18.2993516 | 230.1699462 |
| Sialyllacto-N-Tetraose b | 42.03248619 | 77.48231245 | 17.91900028 | 203.3889653 |
| Sialyllacto-N-Tetraose b | 34.20021019 | 69.2258118 | 15.77729891 | 176.0331169 |
| Sialyllacto-N-Tetraose b | 31.10428435 | 63.33068783 | 14.36759859 | 161.4190188 |
| Sialyllacto-N-Tetraose b | 59.09832119 | 95.39076549 | 36.70322691 | 190.496288 |
| Sialyllacto-N-Tetraose b | 63.00766627 | 99.34148018 | 16.07949427 | 176.9251632 |
| Sialyllacto-N-Tetraose b | 58.42526875 | 97.31339889 | 16.14913449 | 192.4038113 |
| Sialyllacto-N-Tetraose b | 40.10314569 | 78.74882648 | 17.09181849 | 177.5190818 |
| Sialyllacto-N-Tetraose b | 31.64970623 | 67.96184529 | 17.88112005 | 159.9283979 |
| Sialyllacto-N-Tetraose b | 28.09090242 | 56.62478649 | 17.40002881 | 118.0078565 |

Example 2

Table XXV sets out a human milk fortifier composition for in accordance with the invention. Said human milk fortifier may be for use to supplement the breast milk produced for an infant of up to 1 month of age by a primiparous mother.

TABLE XV

| Nutrient | Per 100 kcal |
|---|---|
| Energy (kcal) | 100 |
| Lipid (g) | 9.76 |
| DHA (mg) | 37.26 |
| Linoleic acid (mg) | 1124.76 |
| α-linolenic acid (mg) | 107.1 |
| ARA (mg) | 47.68 |
| ARA/DHA ratio | 1.28 |
| Linoleic/α-linolenic ratio | 10.5 |
| EPA (mg) | 4.06 |
| EPA/DHA ratio | 0.11 |
| MCT (g) | 1.4 |
| Protein (g) | 0.7 |
| Carbohydrate (g) | 2.3 |
| Minerals and electrolytes | |
| Na (mg) | 71.25 |
| K (mg) | 113.62 |
| Cl (mg) | 100.12 |
| Ca (mg) | 116.41 |
| P (mg) | 69.27 |
| Mg (mg) | 8.50 |
| Mn (µg) | 7.40 |
| Fe (mg) | 2.11 |
| Cu (mg) | 0.10 |
| Zn (mg) | 1.48 |
| I (µg) | 33.76 |
| Se (µg) | 6.75 |
| F (µg) | 1.40 |
| Cr (µg) | 0.88 |
| Mo (µg) | 0.93 |
| Vitamins and trace elements | |
| Vitamin A (µg) | 518.04 |
| Vitamin D (µg) | 4.61 |
| Vitamin E (mg) | 4.3 |
| Vitamin K (µg) | 8.3 |
| Vitamin C (mg) | 24.4 |
| Vitamin B1 (mg) | 0.159 |
| Vitamin B2 (mg) | 0.227 |
| Niacin (mg) | 1.99 |
| Vitamin B6 (mg) | 0.16 |
| Folic acid (µg) | 50.17 |
| Vitamin B12 (µg) | 0.26 |
| Pantothenic acid (mg) | 1.08 |
| Biotin (µg) | 4.70 |
| Choline (mg) | 10.01 |
| Inositol (mg) | 5.59 |
| Taurine (mg) | 6.98 |
| Carnitine (mg) | 4.89 |
| 3-Fucosyllactose (mg) | 13.5 |
| Lacto-N-Fucosylpentaose II (mg) | 15 |

The composition according to the present invention may be formulated with many variations without departing from the scope of the invention as defined in the claims.

Example 3

Table XVI sets out an HMO human milk fortifier composition in accordance with the invention. Said human milk fortifier may be for use to supplement the breast milk produced for an infant of up to 1 month of age by a primiparous mother.

TABLE XVI

| HMO | mg/L |
|---|---|
| 3-Fucosyllactose | 90 |
| Lacto-N-Fucosylpentaose II | 100 |
| 2'-Fucosyllactose | 100 |
| Lactose | ?? |

Example 4

Table XVII sets out a human milk fortifier composition for in accordance with the invention. Said human milk fortifier may be for use to supplement the breast milk produced for an infant of up to 1 month of age by a multiparous mother. Said human milk fortifier composition may be comprised in a nutritional system with the human milk fortifier composition set out in example 2 wherein said composition of example 2 is specifically tailored for use to supplement the breast milk produced for an infant of up to 1 month of age by a primiparous mother.

TABLE XVII

| Nutrient | Per 100 kcal |
|---|---|
| Energy (kcal) | 100 |
| Lipid (g) | 9.76 |
| DHA (mg) | 37.26 |
| Linoleic acid (mg) | 1124.76 |
| α-linolenic acid (mg) | 107.1 |
| ARA (mg) | 47.68 |
| ARA/DHA ratio | 1.28 |
| Linoleic/α-linolenic ratio | 10.5 |
| EPA (mg) | 4.06 |
| EPA/DHA ratio | 0.11 |
| MCT (g) | 1.4 |
| Protein (g) | 0.7 |
| Carbohydrate (g) | 2.3 |
| Minerals and electrolytes | |
| Na (mg) | 71.25 |
| K (mg) | 113.62 |
| Cl (mg) | 100.12 |
| Ca (mg) | 116.41 |
| P (mg) | 69.27 |
| Mg (mg) | 8.50 |
| Mn (µg) | 7.40 |
| Fe (mg) | 2.11 |
| Cu (mg) | 0.10 |
| Zn (mg) | 1.48 |
| I (µg) | 33.76 |
| Se (µg) | 6.75 |
| F (µg) | 1.40 |
| Cr (µg) | 0.88 |
| Mo (µg) | 0.93 |
| Vitamins and trace elements | |
| Vitamin A (µg) | 518.04 |
| Vitamin D (µg) | 4.61 |
| Vitamin E (mg) | 4.3 |
| Vitamin K (µg) | 8.3 |
| Vitamin C (mg) | 24.4 |
| Vitamin B1 (mg) | 0.159 |
| Vitamin B2 (mg) | 0.227 |
| Niacin (mg) | 1.99 |
| Vitamin B6 (mg) | 0.16 |
| Folic acid (µg) | 50.17 |
| Vitamin B12 (µg) | 0.26 |
| Pantothenic acid (mg) | 1.08 |
| Biotin (µg) | 4.70 |
| Choline (mg) | 10.01 |
| Inositol (mg) | 5.59 |
| Taurine (mg) | 6.98 |
| Carnitine (mg) | 4.89 |

The composition according to the present invention may be formulated with many variations without departing from the scope of the invention as defined in the claims.

The invention claimed is:

1. A method to fortify breast milk of a mother, the method comprising:

determining whether the mother is a primiparous woman;

measuring out an amount of a human milk fortifier composition comprising a combination of:

(i) at least two human milk oligosaccharides selected from the group consisting of 3-Fucosyllactose in an amount of 1-3600 mg/L of the composition, 6'Galactosyllactose in an amount of 0.09-250 mg/L of the composition, and Lacto-N-Tetraose in an amount of 4-3400 mg/L of the composition; and (ii) at least one further human milk oligosaccharide selected from the group consisting of 2-Fucosyllactose in the amount of 9-8500 mg/L of the composition; Blood group A Tetrasaccharide in an amount of 1-1000 mg/L of the composition; Difucosyllacto-N-Hexose-A in an amount of 0.4-1100 mg/L of the composition; Lacto-N-Difucosylhexose in an amount of 20-3000 mg/L of the composition; Lacto-N-Fucosylpentaose-I in an amount of 0.4-4300 mg/L of the composition; Lacto-N-Fucosylpentaose-II in an amount of 32-3600 mg/L of the composition; Lacto-N-Fucosylpentaose-III in an amount of 13-800 mg/L of the composition; Lacto-N-Fucosylpentaose-V in an amount of 1.5-500 mg/L of the composition; Lacto-N-hexaose A in an amount of 0.15-200 mg/L of the composition; Lacto-N-hexaose B in an amount of 0.3-120 mg/L of the composition; Lacto-N-Neodifucosylhexose in an amount of 0.3-330 mg/L of the composition; Lacto-N-Neofucosylpentaose in an amount of 0.1-65 mg/L of the composition; Lactodifucosyl lactose in an amount of 2-3300 mg/L of the composition; Sialyllacto-N-Tetraose a in an amount of 1.5-1900 mg/L of the composition; Sialyllacto-N-Tetraose b in an amount of 0.7-180 mg/L of the composition; and mixtures thereof;

combining the human milk fortifier composition with human breast milk from the mother who is a primiparous woman to form an admixture; and administering the admixture, which comprises the human milk fortifier composition and the human breast milk from the mother who is a primiparous woman, to an infant who was born from the mother who is a primiparous woman.

2. The method of claim 1, wherein the at least one further human milk oligosaccharide comprises 2-Fucosyllactose.

3. The method of claim 1, wherein the at least one further human milk oligosaccharide comprises Blood group A Tetrasaccharide.

4. The method of claim 1, wherein the at least one further human milk oligosaccharide comprises one or more of Lacto-N-Fucosylpentaose-I, Lacto-N-Difucosylhexose, or Lacto-N-Fucosylpentaose-III.

5. The method of claim 1, wherein the at least one further human milk oligosaccharide comprises one or more of Disialyllacto-N-tetraose, DiFucosyllacto-N-hexaose, Lactodifucosyllactose, Sialyllacto-N-Tetraose b, or Sialyllacto-N-Tetraose c.

6. The method of claim 1, wherein the at least one further human milk oligosaccharide comprises one or more of Lacto-N-Fucosylpentaose-I, Lacto-N-Fucosylpentaose-II, or Lacto-N-Fucosylpentaose-III.

7. A method for optimising and/or preventing sub-optimal growth and development in an infant having or at risk of sub-optimal growth and development who was born preterm to a mother who is primiparous, the method comprising:

identifying the mother as being a primiparous woman;

combining a human milk fortifier composition with human breast milk from the mother who is a primiparous woman to form an admixture, wherein the human milk fortifier comprises a combination of:

(i) at least two human milk oligosaccharides selected from the group consisting of 3-Fucosyllactose in an amount of 1-3600 mg/L of the composition; 6'Galactosyllactose in an amount of 0.09-250 mg/L of the composition; and Lacto-N-Tetraose in an amount of 4-3400 mg/L of the composition; and (ii) at least one further human milk oligosaccharide selected from the group consisting of 2-Fucosyllactose in an amount of 9-8500 mg/L of the composition; Blood group A Tetrasaccharide in an amount of 1-1000 mg/L of the composition; Difucosyllacto-N-Hexose-A in an amount of 0.4-1100 mg/L of the composition; Lacto-N-Difucosyl hexose in an amount of 20-3000 mg/L of the composition; Lacto-N-Fucosylpentaose-I in an amount of 0.4-4300 mg/L of the composition; Lacto-N-Fucosylpentaose-II in an amount of 32-3600 mg/L of the composition; Lacto-N-Fucosylpentaose-III in an amount of 13-800 mg/L of the composition; Lacto-N-Fucosylpentaose-V in an amount of 1.5-500 mg/L of the composition; Lacto-N-hexaose A in an amount of 0.15-200 mg/L of the composition; Lacto-N-hexaose B in an amount of 0.3-120 mg/L of the composition; Lacto-N-Neodifucosylhexose in an amount of 0.3-330 mg/L of the composition; Lacto-N-Neofucosylpentaose in an amount of 0.1-65 mg/L of the composition; Lactodifucosyl lactose in an amount of 2-3300 mg/L of the composition; Sialyllacto-N-Tetraose a in an amount of 1.5-1900 mg/L of the composition; Sialyllacto-N-Tetraose b in an amount of 0.7-180 mg/L of the composition; and mixtures thereof; and administering the admixture, which comprises the human milk fortifier composition and the human breast milk from the mother who is a primiparous woman, to the infant having or at risk of the suboptimal growth and development who was born preterm to the mother who is a primiparous woman, the admixture administered in an effective amount to provide a benefit selected from the group consisting of weight growth, lean mass growth, fat mass growth, reducing a risk of later adverse metabolic conditions, and combinations thereof.

8. The method of claim 7, wherein the at least two human milk oligosaccharides in the human milk fortifier are selected from the group consisting of 3-Fucosyllactose in an amount of 51-230 mg/L of the composition; 6' Galactosyllactose in an amount of 0.09-11 mg/L of the composition; and Lacto-N-Tetraose in an amount of 23-125 mg/L of the composition;

wherein the at least one further human milk oligosaccharide is selected from the group consisting of 2-Fucosyllactose in an amount of 9-350 mg/L of the composition; Blood group A Tetrasaccharide in an amount of 1.5-22 mg/L of the composition; Difucosyllacto-N-Hexose-A in an amount of 0.4-9 mg/L of the composition; Lacto-N-Difucosylhexose in an amount of 20-160 mg/L of the composition; Lacto-N-Fucosyl pentaose-I in an amount of 0.4-75 mg/L of the composition; Lacto-N-Fucosyl pentaose-II in an amount of 14-190 mg/L of the composition; Lacto-N-Fucosylpentaose-III in an amount of 13-16 mg/L of the composition; Lacto-N-Fucosylpentaose-V in an amount of 1.5-22 mg/L of the composition; Lacto-N-hexaose A in an amount of 2-4 mg/L of the composition; Lacto-N-hexaose B in an amount of 1-4.5 mg/L of the composition; Lacto-N-Neodifucosylhexose in an amount of 1.1-9 mg/L of the composition; Lacto-N-Neofucosyl-pentaose in an amount of 1.8-6 mg/L of the composition; Lactodifucosyllactose in an amount of 2-38 mg/L of the composition; Sialyllacto-N-Tetraose a in an amount of 1.5-36 mg/L of the composition; Sialyllacto-N-Tetraose b in an amount of 0.7-11 mg/L of the composition; and mixtures thereof.

9. The method of claim 7, wherein the infant has an age up to one month, the at least two human milk oligosaccharides comprise 3-Fucosyllactose in an amount of 51-230 mg/L of the composition, and the at least one further human milk oligosaccharide comprises Lacto-N-Fucosylpentaose II in an amount of 14-190 mg/L of the composition.

10. The method of claim 7, wherein the at least two human milk oligosaccharides comprise 3-Fucosyllactose, and the at least one further human milk oligosaccharide comprises Lacto-N-Fucosylpentaose II.

11. The method of claim 7, wherein the at least two human milk oligosaccharides comprise 3'-Fucosyllactose, and the at least one further human milk oligosaccharide comprises Lacto-N-Fucosylpentaose.

12. The method of claim 7, wherein the at least one further human milk oligosaccharide comprises Lacto-N-Lacto-N-Fucosylpentaose-II.

13. The method of claim 7, wherein the infant has an age up to 4 months.

14. The method of claim 7, wherein the infant has an age up 1 week.

15. The method of claim 7, wherein the infant is an infant born alive prior to 37 weeks of gestation.

16. The method of claim 7, wherein the at least one further human milk oligosaccharide comprises 2-Fucosyllactose.

17. The method of claim 7, wherein the at least one further human milk oligosaccharide comprises Blood group A Tet-rasaccharide.

18. The method of claim 7, wherein the at least one further human milk oligosaccharide comprises one or more of Lacto-N-Fucosylpentaose-I, Lacto-N-Difucosylhexose, or Lacto-N-Fucosylpentaose-III.

19. The method of claim 7, wherein the at least one further human milk oligosaccharide comprises one or more of Disialyllacto-N-tetraose, DiFucosyllacto-N-hexaose, Lacto-difucosyllactose, Sialyllacto-N-Tetraose b, or Sialyllacto-N-Tetraose c.

20. The method of claim 7, wherein the at least one further human milk oligosaccharide comprises one or more of one or more of Lacto-N-Fucosylpentaose-I, Lacto-N-Fucosyl-pentaose-II, or Lacto-NFucosylpentaose-III.

* * * * *